(12) United States Patent
Preece et al.

(10) Patent No.: US 11,906,657 B2
(45) Date of Patent: Feb. 20, 2024

(54) SYSTEM AND METHOD FOR DRONE AND OBJECT CLASSIFICATION

(71) Applicant: Fortem Technologies, Inc., Pleasant Grove, UT (US)

(72) Inventors: David Preece, Elk Ridge, UT (US); Mikko Valimaki, Orem, UT (US); Mitchell Kay Oldroyd, Bluffdale, UT (US); Adam Eugene Robertson, Provo, UT (US); Bryan Alan Davis, Salt Lake City, UT (US); Matthew Elliott Argyle, Lindon, UT (US); David Thimm, Orem, UT (US); James David Mackie, Provo, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 940 days.

(21) Appl. No.: 16/589,678

(22) Filed: Oct. 1, 2019

(65) Prior Publication Data

US 2020/0103499 A1 Apr. 2, 2020

Related U.S. Application Data

(60) Provisional application No. 62/739,973, filed on Oct. 2, 2018.

(51) Int. Cl.
*G01S 7/41* (2006.01)
*G06N 3/04* (2023.01)
(Continued)

(52) U.S. Cl.
CPC ............. *G01S 7/415* (2013.01); *G01S 13/86* (2013.01); *G01S 13/867* (2013.01); *G06N 3/04* (2013.01);
(Continued)

(58) Field of Classification Search
CPC ........ G01S 7/415; G01S 13/86; G01S 13/867; G01S 7/417; G06N 3/04; G06N 3/08; B64U 10/13
(Continued)

(56) References Cited

U.S. PATENT DOCUMENTS 4,814,768 A * 3/1989 Chang ..................... G01V 3/30
324/333
5,949,367 A * 9/1999 Trompf ................... G01S 7/417
700/48

(Continued)

FOREIGN PATENT DOCUMENTS

GB 2562829 A 11/2018

*Primary Examiner* — Bo Fan

(57) ABSTRACT

A method and system device provides a unique object identification process by obtaining information from one or more of radar signals, infrared signals, optical signals, audio signals, and other signals. The method includes continuously receiving object data at the device, applying by a machine learning system, a set of parameters to process the object identification and confidence level, and outputting or updating the object identification, confidence level, and actionable recommendations. The radar data includes a Doppler signature having a wrapped signal due to a sampling rate of the radar system. The Doppler signature is used to train the machine learning system to identify drone types.

19 Claims, 13 Drawing Sheets

(51) Int. Cl.
*G06N 3/08* (2023.01)
*G01S 13/86* (2006.01)
*B64C 39/02* (2023.01)
*B64U 10/10* (2023.01)
*B64U 10/13* (2023.01)

(52) U.S. Cl.
CPC ............... *G06N 3/08* (2013.01); *B64C 39/02* (2013.01); *B64U 10/10* (2023.01); *B64U 10/13* (2023.01); *G01S 7/417* (2013.01)

(58) Field of Classification Search
USPC ................................ 342/28; 700/48; 706/12
See application file for complete search history.

(56) References Cited

U.S. PATENT DOCUMENTS

| | | | |
|---|---|---|---|
| 6,653,971 B1 * | 11/2003 | Guice | A01M 1/026 |
| | | | 342/28 |
| 7,149,147 B1 * | 12/2006 | Goldman | G01S 15/89 |
| | | | 367/88 |
| 9,997,079 B2 * | 6/2018 | Paczan | B64C 39/024 |
| 10,051,475 B2 | 8/2018 | Shattil et al. | |
| 2014/0088429 A1 * | 3/2014 | Lomes | A61B 8/145 |
| | | | 600/443 |
| 2017/0092138 A1 * | 3/2017 | Trundle | G08B 25/14 |
| 2017/0129603 A1 * | 5/2017 | Raptopoulos | B64C 39/024 |
| 2018/0158197 A1 | 6/2018 | Martirosyan et al. | |

* cited by examiner

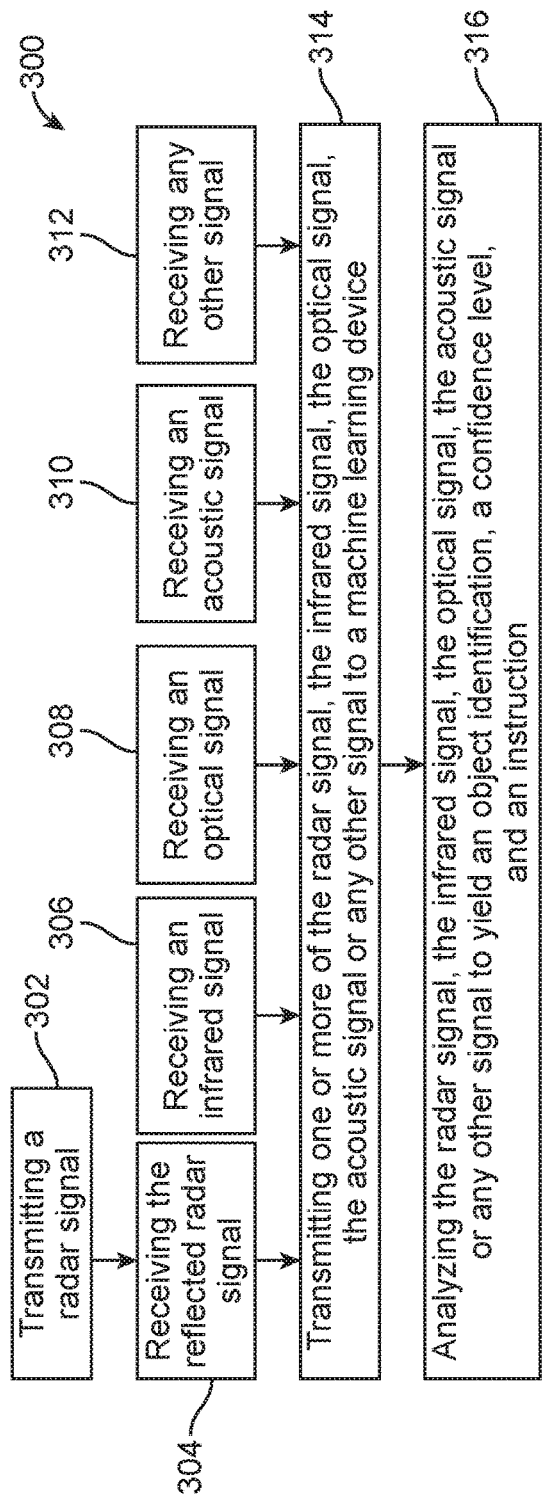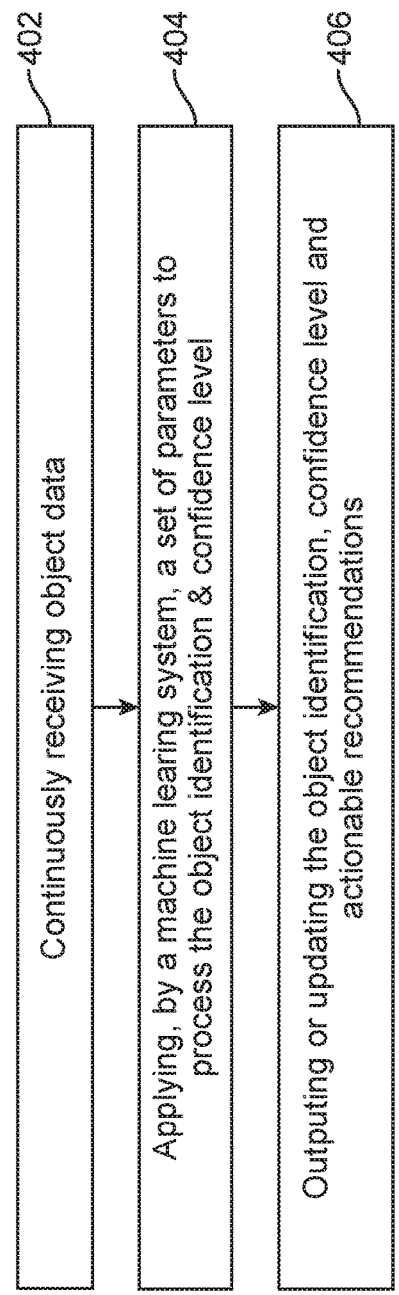
FIG. 3
FIG. 4

SYSTEM AND METHOD FOR DRONE AND OBJECT CLASSIFICATION

PRIORITY

The present application claims priority to U.S. Provisional Application No. 62/739,973, filed Oct. 2, 2018, the contents of which are herein incorporated by reference in their entirety.

TECHNICAL FIELD

The present disclosure relates to object classification through the use of one or more of radar signals, infrared signals, optical signals, audio and other technologies coupled with artificial intelligence and/or machine learning. In a drone scenario, the radar signals will generate a Doppler signature associated with the movement of rotary blades of the drone and the classification process utilizes a machine learning algorithm that is trained on Doppler signatures associated with different drone types and even specific drones.

BACKGROUND

Although drone technology has been around for half a century, high production costs and older technology limited owners of large and bulky drones to include mostly that of military or special interest groups. Advancements in drone technology reduced the price and size of drones, eventually making them more readily available to individual consumers. With an increase in consumer drones, problems began to surface regarding privacy and security issues.

Many consumer drones include bright lights and are accompanied by a loud buzzing sound when it is within close proximity of an observer. However, as consumer drones move further away from the observer, they are less conspicuous as the sound diminishes and the shape of the drone fades. During daylight, even the lights do little to assist in being able to decipher whether the object in the air is a drone or a bird.

Hostile or evasive drones go through great lengths to minimize or eliminate drone identifying characteristic to remain as undetectable as possible. Many drones are able to carry and deploy a payload. Although there are many positive applications, such as being able to provide a quick product delivery method, other hostile applications exist as well, such as carrying and deploying an explosive or harmful chemical agent. Not being able to tell the difference between a drone and a bird can be a major problem for governments, event planners, or any land owner.

BRIEF INTRODUCTION

The problems outlined above highlight the need to properly identify or classify a drone or flying object, particularly if the drone is exhibiting hostile maneuvers or evading detection. The presented solutions introduce a number of different mechanisms, including machine learning algorithms, in order to receive one or more signals associated with an object so as to be able to classify the object in ways that have not been previously possible. Further, it is important to handle such issues as avoiding false alarms from birds, detecting drones uniquely from other items in the air, detecting manned sized aircraft uniquely from other items in the air, tracking objects, and also detecting a particular class of drone and even a specific drone within a class of drones.

One example method includes transmitting a radar signal from a device to an object. Radar frequencies are usually between 30 MHz and 300 GHz. The reflected radar signal received by the device is processed to enable the device to classify the object. This is done by applying a machine learning algorithm to the reflected signal where the machine learning algorithm is trained by using previously identified radar data. One aspect of this disclosure relates to the fact that a drone will reflect a radar signature having a certain Doppler characteristic that corresponds to a size, speed and structure of propeller blades of the drone as well as other drone physical characteristics. The Doppler signature will have certain characteristics that spread or wrap in a graphical view of the reflected signal based on a sampling of the signal by the system. Such signatures for specific objects can be used to train the machine learning algorithm to recognize a certain class of drone or even the specific drone. Furthermore, the Doppler signature can also be evaluated to determine or infer the load carried by the drone. For example, where the system is trained on propeller characteristics for a drone, the propellers may be laboring at a higher rate than is expected which can indicate a heavy load or the existence of a load. This type of data can be evaluated to determine such data as the drone type, the existence of a load, the weight of the load, a signature of a specific drone, and so forth.

Other data associated with the object can also be used for classification purposes. For example, a method can include using the reflected radar signal in combination with the object's infrared signal to classify the object. Infrared frequencies are typically between 700 nm to 1 mm. Using a combination of signal types for classification is achieved by applying the machine learning algorithm to the reflected radar signal and the infrared signal where the machine learning algorithm is trained using previously identified and labeled infrared signals. The object can also transmit an identification signal as well that can be used to confirm or identify the object in connection with other data received, as disclosed herein.

Another example method includes using the reflected radar signal (Doppler signature) and an audio signal produced by the object to classify the object. This is done by applying the machine learning algorithm to the reflected radar signal and the audio signal where the machine learning algorithm is trained by using previously identified and classified audio signals including based on the spreading characteristics of the signal based on drone blade movement and size characteristics. The training can include Doppler characteristics of the audio signal as well.

Another example method includes using the reflected radar signal (Doppler signature) and the object's optical signal to classify the object. This is done by applying the machine learning algorithm to the reflected radar signal and the optical signal where the machine learning algorithm is trained by using previously identified and labeled optical signals.

Another example method includes using the reflected radar signal (Doppler signature) and an audio signal, infrared signal and an optical signal produced by or associated with the object to classify the object. This is achieved by applying the machine learning algorithm to the reflected radar signal, audio signal, infrared signal and optical signal where the machine learning algorithm is trained by using previously identified and classified audio, infrared and optical signals. The system can apply a fusion of the various signals when making classification decisions. Different machine learning algorithms or different versions of the same machine learning algorithm can apply when a particular set of signal types are received by the system and which are available to be evaluated for classification of the object.

Alternatively, machine learning algorithms can use movement patterns associated with the object in combination with one or more of the reflected radar signal, an audio signal associated with the object, an infrared signal associated with the object and an optical signal associated with the object to classify the object. The movement patterns can relate to a flying object or ground-based objects and can include only the object itself or the movement pattern of a group of objects. As in other cases, the machine learning algorithm would be trained using previously labeled movement patterns of various objects.

In another example, a tracking engine or tracking algorithm can identify an object and track its movement. A first Doppler signature associated with the moving first object might then overlap or interfere with a Doppler signature of a second object where two objects are being tracked. Unique identification codes or numbers can be assigned to each object for use in tracking, killing or filtering an object relative to other objects. The system can also include a filter which can utilize the data associated with the Doppler signature of the first object so that the overlapping signature can be removed from the Doppler signature of the second object. As a result, the system can generate a more at accurate classification of the second object.

Another example method includes classifying what, or if, the object is carrying, through use of a machine learning algorithm and based on one or a combination of one or more of either the reflected radar signal (Doppler signature), an audio signal associated with the object, an infrared signal associated with the object or an optical signal associated with the object. The machine learning algorithm can be trained utilizing previously labeled payloads. The classification whether the object is carrying a payload can occur via an analysis of the Doppler signature which can indicate that the movement of the rotary blades of a drone is more labored or different, due to the existence of the payload from the movement of the rotary blades of the drone without a payload.

There are different applications for classifying an object. One application may include transmitting instructions, based on the classification of the object, to an aerial vehicle scheduling and routing module. Alternatively, instructions can be given to an aerial vehicle to engage with the object, the object being either a ground-based object or a flying object.

One example system includes a processor and a computer-readable storage medium that has instructions stored. When the instructions are executed by the processor, the processor performs different operations that include transmitting a radar signal from a device to an object, receiving the reflected signal back from the object, and classifying the object by applying a machine learning algorithm to the reflected radar signal or Doppler signature. The system may be a drone and having a mobile radar system attached to the drone. The result is a classification of the object through a machine learning algorithm that is trained on reflected radar signal information. The machine learning algorithm can be trained on such data as the Doppler signature associated with specific types of drones, and even the Doppler signature of specific drones. For example, if a specific drone had a damaged propeller blade, that specific drone would cause a unique Doppler signature which could be used to identify that specific drone.

Additionally, the instructions executed by the processor may require receiving an infrared signal associated with the object and classifying the object by applying the machine learning algorithm to the reflected signal and the infrared signal. The result in this scenario is a classification using the machine learning algorithm trained using labeled infrared signals.

Instructions carried out by the processor may also cause that the processor receives at the device an audio signal associated with the object. Applying the machine learning algorithm to the reflected radar signal and the audio signal can also result in a classification as the machine learning algorithm can be trained utilizing labeled audio signals.

In addition, one example system may include instructions executed by the processor to receive an optical signal associated with the object and use a trained machine learning algorithm to classify the object.

An example system can utilize a combination of instructions executed by the processor. The instructions can include the device receiving an audio signal, an infrared signal, and an optical signal, and classifying the object by applying the trained machine learning algorithm to the reflected radar signal, the audio signal, the infrared signal and the optical signal.

One system example may include instructions executed by the processor to perform operations including determining, by the trained machine learning algorithm, a moving pattern associated with the object based on one or a combination of the object's reflected radar signal, audio signal, infrared signal and/or optical signal. The trained machine learning algorithm can classify the object through the use of data related to various moving patterns. In addition, the system can filter out a Doppler signature associated with an object that is interfering with the Doppler signature of another object. Thus, the classification process can include a filtering process which identifies data based on tracking objects such that a cleaner interpretation of a respective Doppler signature can be provided with a higher confidence level.

The machine learning algorithm can be trained on a fusion of any combination of the various kinds of signals that are available through system disclosed herein. The classification decision is improved based on the training and use of different types of signals.

Lastly, an example system can include a radar component that transmits a radar signal a receives a reflected radar signal or Doppler signature from an object, an infrared receptor that receives an emitted infrared signal from the object, a microphone that receives an audible signal generated by the object, and a camera that receives an optical signal of an object. The machine learning module can receive one or more of either the reflected radar signal, emitted infrared signal, or associated optical signal, and utilizes the information to classify the moving object.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

FIG. 3 illustrates an example flow of the signal analysis process;

FIG. 4 illustrates an example flow of the object identification process;

DETAILED DESCRIPTION

Various embodiments of the disclosure are discussed in detail below. While specific implementations are discussed, it should be understood that this is done for illustration purposes only. Other components and configurations may be used without parting from the spirit and scope of the disclosure. The disclosure now turns to FIG. 1.

Figure 1:
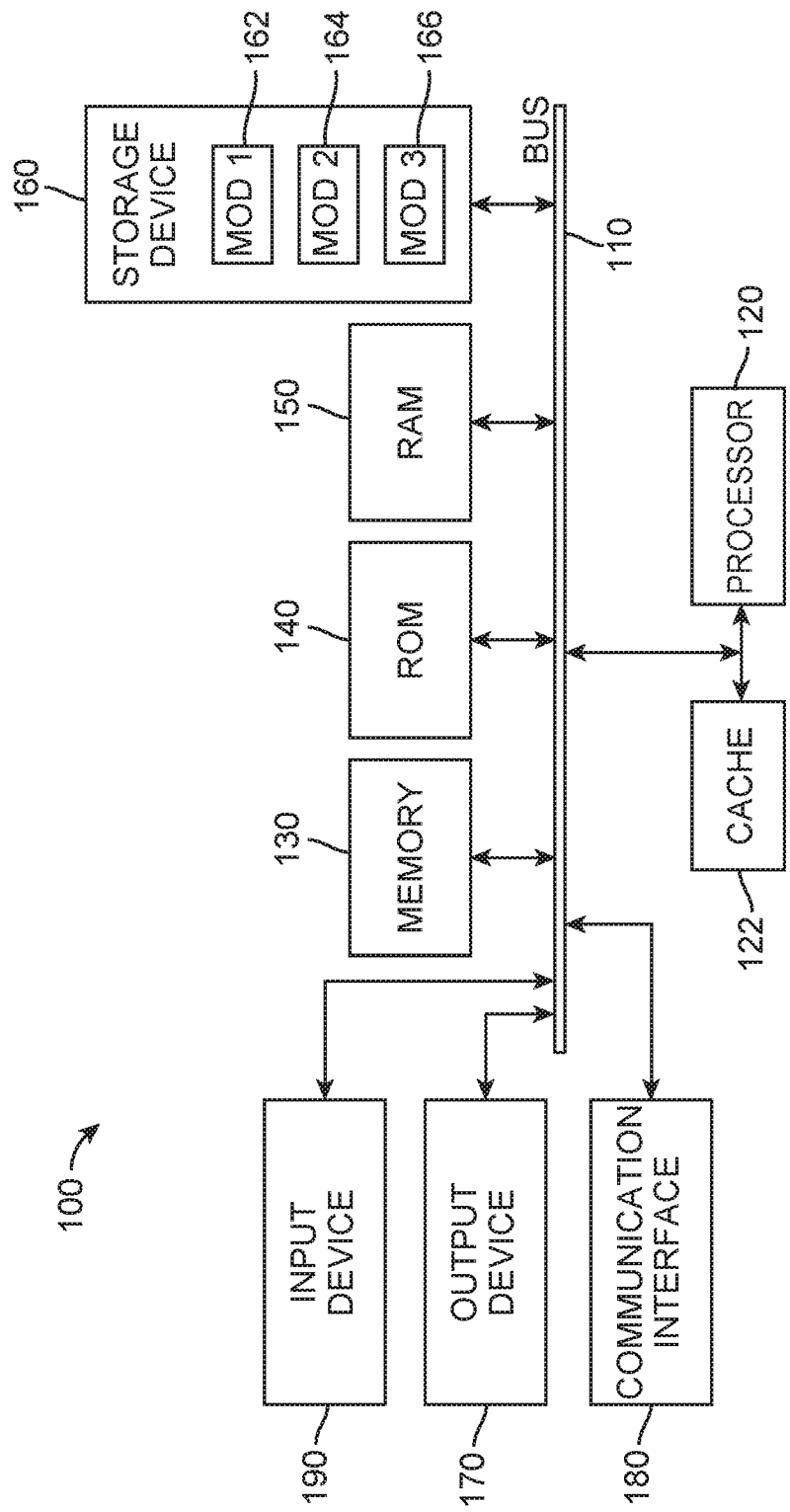
FIG. 1 illustrates an example system embodiment.

With reference to FIG. 1, an exemplary system and/or computing device 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with, in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are configured to control the processor 120. These modules may be stored on the storage device 160 and loaded into RAM 150 or memory 130 at runtime or may be stored in other computer-readable memory locations.

Figure 2:
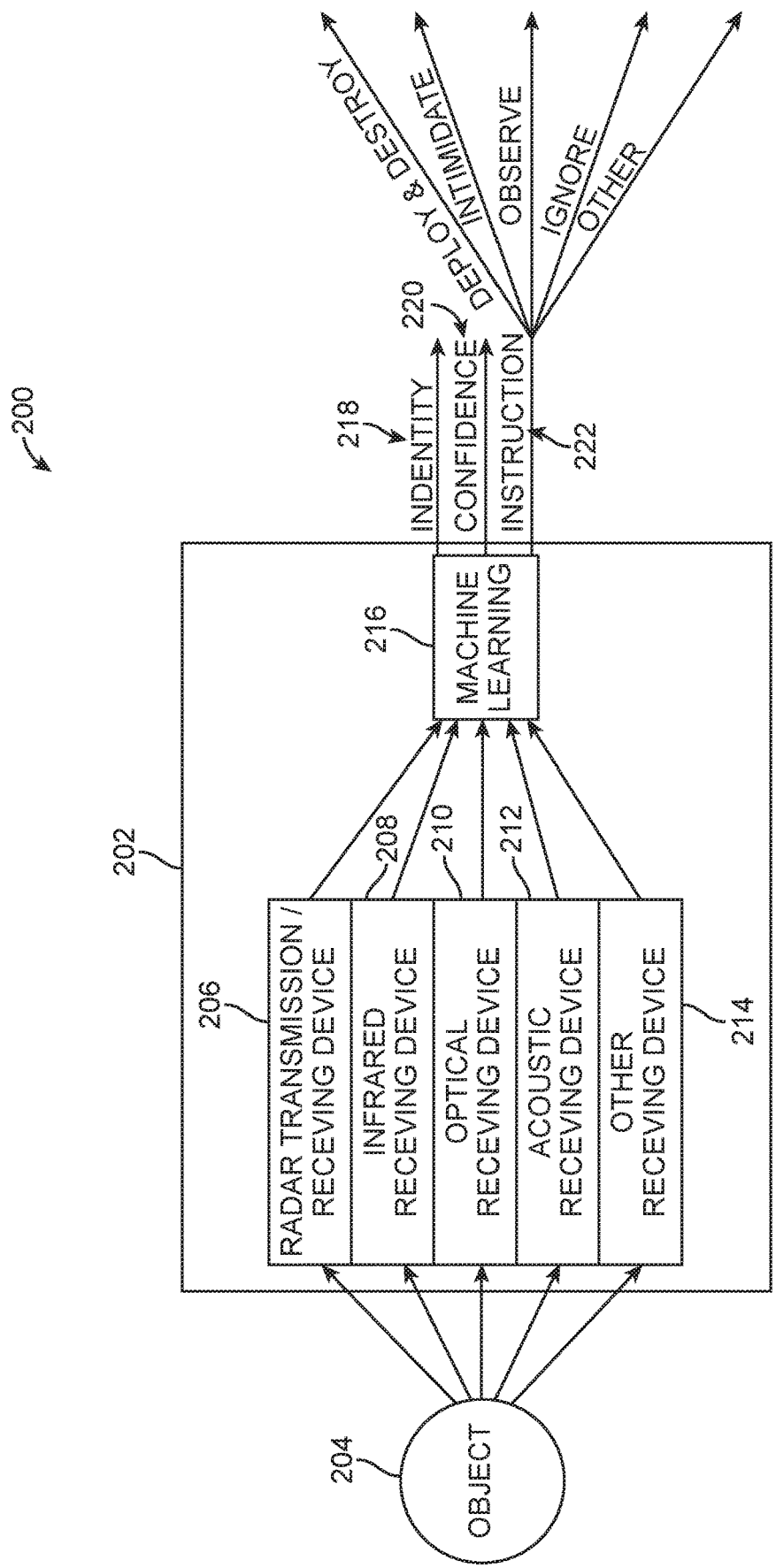
FIG. 2 illustrates an example object identification model that receives object information and generates output parameters.

The disclosure now turns to the various approaches to classifying objects using one or more signal types and particularly to using machine learning on Doppler signatures of objects such as drones or other types of objects. FIG. 2 illustrates the basic components 200 of the model described herein. The present disclosure focuses on an aspect of object identification parameters dealing with the device 202. At a basic level, component 202 gathers information, interprets the information, and outputs information. First, a radar transmission and receiving device 206 transmits a signal that is reflected back from an object 204. The radar transmission and receiving device 206 can include a portable radar system that can be configured on a drone, and can include a 3D radar sensor that detects and monitors with precision, day or night, in various weather conditions. It can include an integrated high-resolution electronically steered patch antenna array as well as an integrated inertial navigation system, which enables clutter rejection in airborne applications. The system can include an Internet output (JSON) for streaming detection and track data to other systems wirelessly or wired. A graphical user interface for reader operation configuration can also be provided and includes application programming interfaces for program a radar control.

The radar signal reflected back from the object will have a certain Doppler signature, having characteristics for respective objects such as drones, birds, vehicles, a person walking, or any object that moves. While this disclosure primarily focuses on drones that have rotary blades, the principles can also be applicable to other objects as well, such as birds or planes that can have a Doppler signature.

The object 204 can be in the air or on land, and can include one object or a group of objects. The device can include an infrared receiving device 208 that receives infrared signals from the object 204, an optical receiving device 210 that receives optical signals from object 204, an acoustic receiving device 212 that receives acoustic signals from the object 204, and/or any other one or multiple alternative signal receiving devices 214 that receive additional information from object 204, such as audio or other signals. Different devices may include modules for receiving different types of signals in which each respective different device can communicate its respective received signal to a system for utilizing respective data in terms of classification of the object.

The input parameters or data will be applied to the machine learning device 216 to determine information such as an identity 218 of the object, and a confidence level 220 of the identification of the object. Based on a classification decision, the system can provide instructions 222 pertaining to the object, such as to the drone carrying the radar system or to a control center or other drone to take an action associated with the classified object. Parameters useful in machine learning based classification as used in the context disclosed typically need to be tested or set via labeling and categorizing. For example, cross validation is a method for robustly estimating test set performance or generalization of the model. One example model can be developed through the use of a convolutional neural net. Such models have been used to analyze pictures to determine if the picture represents a cat, a dog or bird. The present disclosure can include the application of convolutional neural nets as applied to drones having propellers such that the convolutional neural net can classify an unknown object is a particular type of drone at a distance of, for example, 400 m.

based on the clarification, instructions pertaining to the object 204 can include commands to a control module or one or more drones to seek and destroy the object, seek and intimidate, seek and observe, ignore, provide instructions to the device to change a movement pattern or to go to a certain location, or any other instructions. The present disclosure introduces a novel approach to receive dynamic information that leads to the identity of an object and/or instructions relative to the object. In one aspect, a drone is configured with the radar or other devices which receive data from an object in order to classify the object. Thus, one drone has one or more of a radar, microphone, a camera, an IR detector, and so forth and is seeking to identify a second drone in order to determine whether to engage the second drone in some manner.

The discussion will now turn to an overview of the process and system, as illustrated in FIG. 3. First, the process 300 involves transmitting a radar signal 302 from a radar antenna or device. The next step includes one or more of receiving the reflected radar signal 304 at the radar, receiving an infrared signal 306, receiving an optical signal 308, receiving an acoustic signal 310, and/or receiving any other signal 312. Any combination of signals can be received for use in classifying the object. The received radar signal can represent a Doppler signature as is shown in FIG. 5B. Such a signature will be unique to each type of drone by virtue of the movement of the propellers associated with the drone. Other movement of the drone can also have a Doppler signature such as its potential speed and ability to maneuver in certain ways. The present disclosure represents an application of a machine learning algorithm, such as a convolutional neural net, in order to evaluate a received Doppler signature and its spread or its characteristics that are generated based on the spin of rotors on the drone. Depending on the Doppler signature configuration, the system can identify whether the object is coming towards the radar or going away from the radar. The characteristics of the spin of the propellers can also be used to classify or identify whether the drone is carrying a load and even what type of load.

The process can include transmitting one or more of the radar signal, the infrared signal, the optical signal, the acoustic signal or any other signal to a machine learning device 314. The machine learning device can then include analyzing one or more of the radar signal, the Doppler signature, the infrared signal, the optical signal, the acoustic signal and/or any other signal to yield an object identification or classification, a confidence level, and/or an instruction 316. This process is continuous and progressive as directed by the machine learning device and will be further discussed below.

Various signals can be received as information associated with the object by the machine learning device 216. The use of radar includes a "detection" process, wherein finding an object is achieved by transmitting a radio signal that will reflect off the object as a radio echo or Doppler signature. Using the reflected radio signal, the distance to the object can be calculated. These radio signals can include frequencies between approximately 30 MHz and 300 GHz. Other frequencies may also be utilized outside this range. IR signals typically will have a range of 70 nm to 1 mm and optical signals have a range of 390 to 700 nm. Other ranges can apply as well. Additionally, multiple frequency transmissions may take place to provide for an increased "visual" of where the object is and where it is going. The system can start with a first type of signal, such as a radar signal, and then based on a movement of the object (such as closer to the radar), then the system can, based on the new distance, add a new type of signal such as optical or audio, and then update the classification decision based on the two different types of data. Then the system can add a third type of signal based on further movement. The distances or point at which a different type of signal is added or subtracted can be based no threshold distances. The system, based on movement of the object, can add or subtract signal types used to classify the object when a certain range parameter is met relative to the distance from the radar system and the object. Further, each signal type can have a quality valuation as well. For example, the audio signal may have a low quality (due to busy traffic or other sounds) and the infrared signal and/or the radar signal may have a relatively high quality. The system may filter or discard the weaker signal. In another aspect, the object may move from being in the dark to being the light, and determine to add the optical signal type based on the device movement or based on a change from night to day or the addition of light onto the object.

Using a radar detection system has several associated advantages. First, radio signals can travel great distances. With the current state of the respective technologies and the nature of radio waves, radar can detect an object at much greater distances than an optical sensor, an infrared sensor or an audio microphone. For example, at 4 kilometers away, neither an infrared signal receiving device, an optical signal receiving device nor an audio receiving device, would be able to detect a moving object. Radar, however, would be able to identify a moving object at 4 kilometers or more. Additionally, radar works in various weather conditions and is not dependent on the amount of sunlight. For example, radar will work in the rain, whereas an infrared receiving device will not. Similarly, radar will work at night, whereas an optical receiving device will not. Identifying an object among various noise levels may be problematic for an audio receiving device, but will be non-problematic for a radar signal as it is not affected by noise. A Doppler signature associated with an object can be received by the radar at a great distance and it is not dependent upon the amount of sunlight.

Radar does have certain limitations. One limitation is that radar devices rely on the movement of an object to be detected and are ineffective or less effective if the object is motionless. For example, while radar can detect a man walking with a gun at 4 kilometers, it cannot detect a stationary man holding a gun at 500 meters. Additionally, radar has a limitation in regards to angle accuracy, which leads to ambiguities in the altitude of an object. Furthermore, a typical radar signal will simply identify that an object is there, but does not provide much in terms of shape and detail making it sometimes difficult to identify an object. However, the use of other signals, such as infrared, optical, audio and/or other signals in a coordinated manner, can help to overcome some of the limitations of radar technology and can increase the effectiveness of the device's object identification process.

A brief description of these types of signals will follow for the other signals that can be used by a machine learning model to classify objects. First, an infrared receiving device is able to detect electromagnetic radiation wavelengths that are longer than those of visible light. Thus, an infrared receiving device is able to detect an object at night where an optical receiving device would fail to detect the object and can help to identify an object that is motionless. Further, infrared can be used to identify a heated element in the object.

Next, an optical signal can provide great detail of an object during the day. The camera can identify detail that would not be able to be captured through the use of radar, infrared or audible receiving devices. Additionally, if the object emits light, an optical receiving device may prove useful in identifying objects at night or in places of low light.

An audio receiving device can be used to further help identify an object. A high powered microphone can be attached to the device to increase the distance at which audio signals can be received. The microphone can be directional so as to help filter out any surrounding sounds. The machine learning algorithm can be trained to identify, for example, objects based on the sound made by an exhaust system, engine, propellers, wings, chirping sounds, a loaded drone versus an empty drone, and so forth. Lastly, other signal receiving devices may be used in solely or in conjunction with any of the previously mentioned signals to aid and assist in the identification of an object.

Next, the disclosure discusses some examples of useful information. The method can include gathering the information using the aforementioned signal receiving devices and then using machine learning to determine and identify the object. The following types of information are non-exhaustive and serve to explain only some of the potential data to be gathered, analyzed and compared in the machine learning device.

Using radar, Doppler signatures, spread signal characteristics, optical signals, audio signals, visual images, and/or infrared signals, movement patterns of an object can be observed wherein the object's movement information can be used to identify and classify an object. Velocity and acceleration are factors that can help narrow and classify the object. Doppler data can be associated with a signal, including radar, IR, optical or audio signals, can be analyzed to determine whether the object is coming towards the device or away from the device. Furthermore, the movement information can be important in terms of the effort to classify an object based on his Doppler signature. As is discussed below with respect to FIG. 5B, a filter can be implemented into the classification system which can filter out intruding Doppler signature data associated with an object that is being tracked from the Doppler signature data associated with an object that the system is attempting to classify.

For flying objects, information such as flight elevation, rate of climb, rate of decent, pitch, yaw and others can be obtained. For example, some drones have object detection and avoidance features wherein if another object is in the drone's flight path trajectory, the drone will automatically circumvent the object and avoid it by flying around, over or under, the object it would have hit. How the object avoidance system works may serve to identify a type of drone. In one example, the system may deploy a test drone to observe how the flying object reacts when the test drone is placed in the path of the flying object. The flying object's avoidance patterns may help in identifying the flying object. Machine learning models can be trained on movement patterns of objects (see feature 704, 708 of FIG. 7). Known objects can be followed via a radar and/or other signals and the Doller signatures or other signature patterns from the various signal types can be stored, labeled and fed into the machine learning algorithm.

Similarly, the actual flying pattern of the object includes the overall trajectories and direction and can prove to be useful information. Flying patterns can also include a range versus time analysis wherein the range or distance covered by an object, and the path the object took to cover the range, can be evaluated against the time taken to move the distance. For example, an eagle is going to have a particular flying pattern, perhaps high in elevation and generally straight. An eagle will cover a range in a linear pattern and will do so in a short amount of time. In contrast, turkey vultures may circle at high elevations and will cover very little distance, but will do so for many hours which will result in a small range over time. Additionally, bats which fly at lower elevations and in a dart-like manner will cover a small range as they do not traverse great distances, but the pattern in which they fly to cover that range, may be fast as they only fly at dusk and during a short time interval. Drones will also have typical flying patterns and different drones may exhibit flying patterns that differ from other drones. The patterns of movement may differ for drones that are loaded with a payload versus others that are not. The machine learning models can be trained on the different movement patterns.

Furthermore, manned aircraft will fly differently from automated programmable drones, which will also fly differently from manually operated drones. Identifying the flight patterns will assist in determining whether a flying object is a bird, a drone, a manned aircraft, a certain class of drone, i.e., a DJI Phantom or an M600, a loaded drone, an empty drone, or some other type of object. Also, the flight patterns of the object to be identified can be observed in comparison to other surrounding objects. For example, if a drone attempted to cloak itself by flying among a flock of birds that were similar in size, the flight pattern of the group of objects could be analyzed to determine which object, if any is an outlier. In this case, the birds may move in synchronization where the drone may follow in similar movements, but may be slightly lagged or delayed. The delayed movement of the drone in comparison to the synchronized movement of the group of birds can result in a confirmation that the drone is not a bird and that further observation may be necessary.

It is noted that training data can be gathered by virtue of utilizing a known object, such as a particular type of drone, and recording radar data, Doppler signatures, audio data, visual data, and/or infrared data. Either manually or in an automated fashion, the system can label the data that is characteristic of that known object. Data can be gathered in different environments, such as busy streets or cluttered environments with birds or other objects. In other words, a drone could be flown in various environments and the basic data gathered about that drone so that characteristic data associated with each type of data disclosed herein can be retrieved and used to train the machine learning algorithm.

In another aspect, training data can be gathered in a variety of ways in an automated fashion. For example, a system can identify that a known drone is entering a particular air corridor or is taking a certain route. Where the drone is identified in advance or dynamically, the system can assign a unique ID to the drone and track its movement. By retrieving Doppler signature data, infrared data, audio data, visual data, and so forth of a known drone through a route traveled in the air, the system can automatically label that data is being associated with a known drone. Thus, one approach could be to implement the infrastructure necessary to track known objects and gather identification or classification data as that object moves through an environment. If the system lost track of the object, or no longer have a confidence level at a threshold of the identification of that object, the training data could no longer be gathered or no longer labeled.

In another example, some drones may provide an identifier signal. The identifier signal can be used to identify the drone shortly after takes off or as it is approaching a landing site. In one aspect, sensing equipment and/or a radar system can be deployed at certain locations, wherein drones are likely to identify themselves. Thus, as a drone moves close to a landing or destination point, it can provide an identification signal 3 miles from the landing site. The system can utilize or turn on the recordation of identification data from radar, infrared, audio, and/or optical to simply gather training data associated with that drone as it approaches the destination point. The system could be set up to retrieve such data from a number of different angles, as the drone approaches the destination point. Thus, once the identification is received, the system could communicate the identification and location of the drone and enable a variety of different angles of training data to be received and fed to a machine learning algorithm.

Once the system has classified an object, the system can utilize data known about that object with respect to its projected flight path. Thus, the system can utilize the projected flight path if the object flies behind the building, behind another object, or is otherwise obscured. The system can more quickly identify the object reappearing on the other side of the building based on an expectation of the location of the object, and when is likely to appear. Thus, part of this disclosure includes the application of a predicted flight path or predicted flight capability associated with an object that is based on a classification of the object as disclosed herein, and applying that data to an analysis of the object as it reappears from behind an obscuring object. The system can also utilize in this respect known physical characteristics of the space behind the obscuring object and that the object is likely to encounter. Furthermore, the system may recognize that an object may fly behind the left side of the building but at the same time, the system may identify that a flock of birds is also flying behind the building from the right side. Again, the system can utilize knowledge about the patterns and characteristics of the object, to predict what kind of avoidance movements the object might make based on the flock of birds. This kind of predictive data can be utilized to more quickly reclassify or redetermine the identity of the object as it moves from behind the obscuring object, particularly if there are other objects as well coming out from behind the building. The training on the machine learning model for known drones, for example, can be used to predict the movement or path of the drone.

Additionally, if the system can identify a Doppler signature associated with a flock of birds, the system may be able to filter out data in a sequential order. The system can identify objects as birds and track their movement, filter out the signatures from classification determinations of objects near the birds or objects in which the radar signature overlaps, and improve the ability of the system to properly classify the object or drone flying in the midst of the birds.

Ground objects also have movement patterns that can be used to help classify or identify an object. A motorcycle is going to move differently than a dirt bike and an all-wheel drive automobile in the snow is going to move differently than that of a two-wheel drive automobile in the snow. These variations in movement patterns of objects on the ground can also be used and analyzed to determine the objects identity or to classify an object on the ground.

The use of radar, optics, audio, and/or infrared can also lead to detailed images to improve the object identification. For example, an object may be identified as a payload carrying drone. However, a more detailed identification through the use of radar, Doppler signatures, audio signatures, optics and/or infrared can lead to an identification of the object's payload or what it is carrying. In one example, the system may identify the type of drone but also identify that the Doppler signature indicates that the propellers on the drone are moving at a faster pace than normal. The drone may transmit and an identification signal as well which can be incorporated by the system into the analysis and classification decisions. The Doppler signature which is associated with the movement of the propellers on the drone can reveal other data about the drone such as whether it is carrying a payload and how heavy the payload is. The system can infer from the various types of data received and analyzed how many pounds of payload it is carrying and can report that amount by percentage or actual weight and an accuracy of that interference.

The data on payload can indicate that the drone is making a delivery for a merchant or that it could be carrying C4 explosives and be under the operation of a terrorist. Additionally, the use of radar, Doppler signatures, optics, audio signals and/or infrared could be used in combination with facial recognition software or other biometric identification systems, to identify persons of interest. In one example, using facial recognition techniques on a drone could be useful when tasked with providing security at an event, such as a public speech given by a prominent, political figure. The drone would serve as an aerial surveyor and use facial recognition to identify any known terrorists or suspects.

In another example, mini-Doppler signatures can be used to determine whether an object is non-biological or biological. For example, the Doppler signature of a bird is going to have a much different signature than that of a drone. This is because the wings of a bird flap at a much slower rate and in a non-circular pattern and alternatively, a drone has propellers that can spin at 3600 revolutions per minute and show very little variance in their range of motion. The system can be trained on the different Doller signatures of birds versus drones at a granular level.

Various types of information from an object have been previously mentioned. However, the information listed is non-exhaustive and can be used solely, or in any combination with each other, or in combination with any other type of non-mentioned information, in a machine learning process to determine the object's identity.

FIG. 4 illustrates an example flow of the object identification process 400. A method includes continuously receiving object data at the device (402), applying, by a machine learning system, a set of parameters to process the object data to identify the object at a confidence level to yield an object identification (404), and outputting or updating the object identification, the confidence level and an actionable recommendation (406). The scope of FIG. 4 may also only include the output of the object identification using a radar signal or Doppler signature as the object data. The actionable recommendation can be any number of instructions to engage with the object, via the same drone attached to the radar system or a separate drone or provide instructions to the object to take an action such as to change course.

For example, instructions may include a geographic or safe stone component. For example, based on a current location of the drone or a projected direction of the drone, as well as potentially being based on other types of information, the system may provide an instruction to take the drone out so that it does not fly over a restricted area, such as a stadium. Instruction to capture or destroy a drone can be based at least in part on the classification decision disclosed herein, in connection with the knowledge of the control system that identifies the zones or geographic regions which are to be protected from the potential threat of the drone.

Figure 5A:
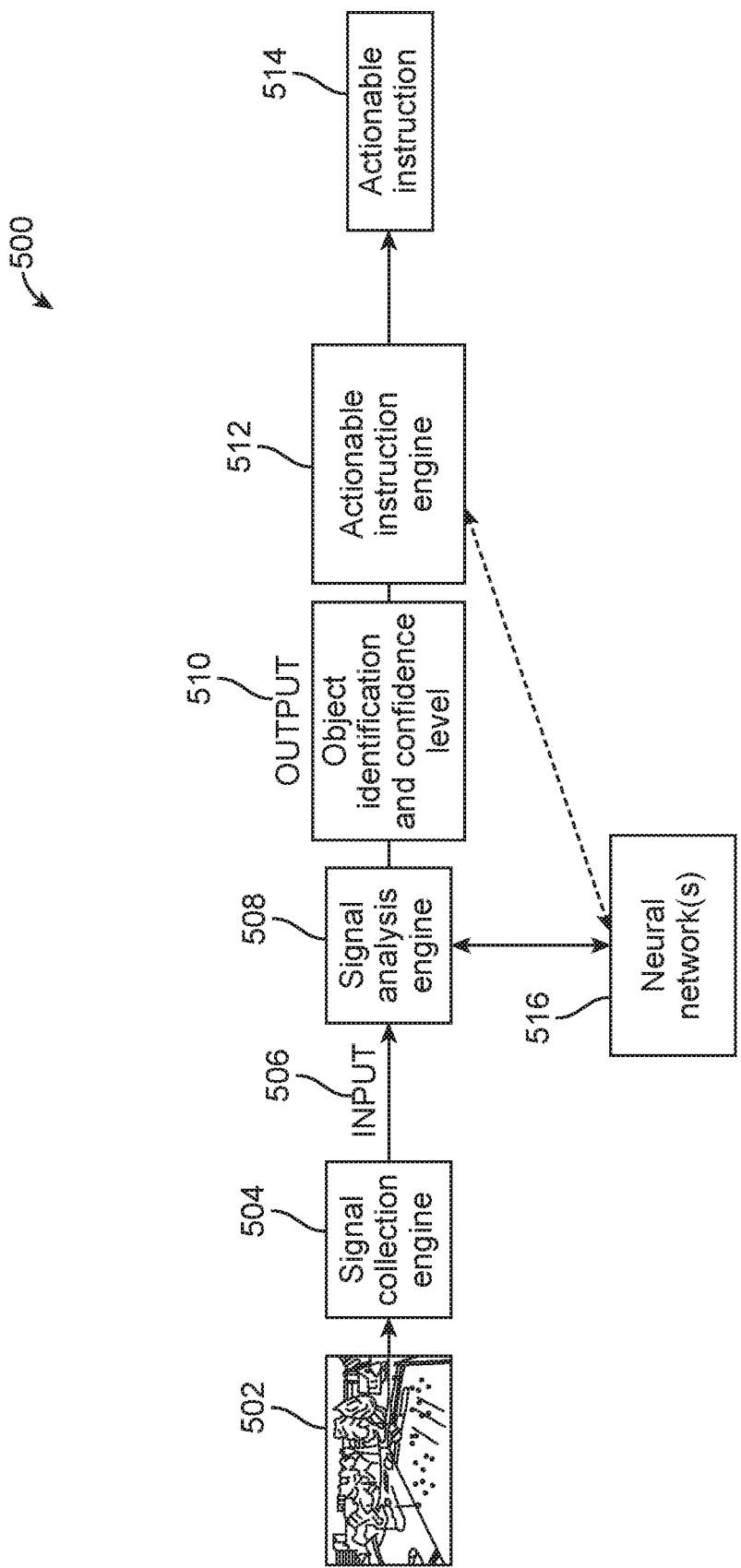
FIG. 5A illustrates an example flow for processing signal data using machine learning.
Figure 5B:
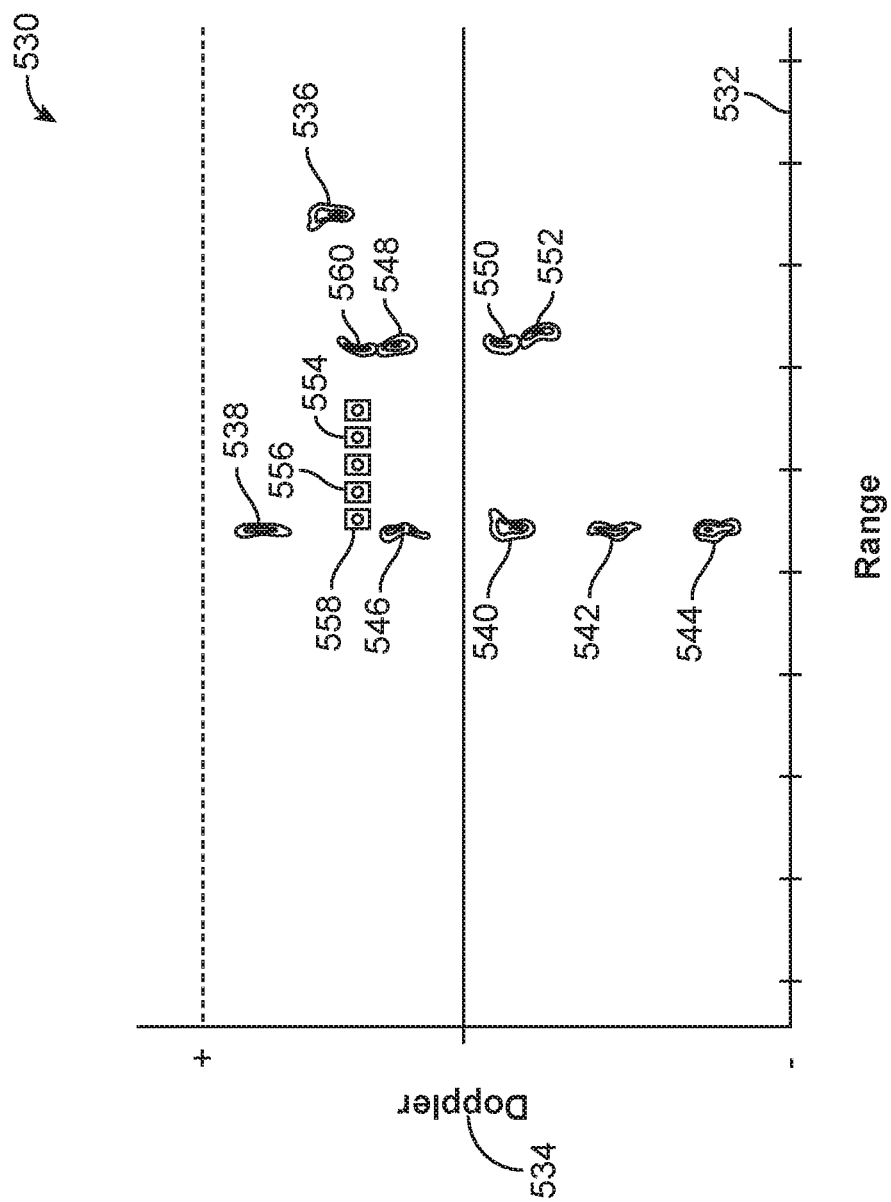
FIG. 5B illustrates a radar signature associated with several objects.

FIG. 5A illustrates an example flow for processing signal data to identify an object and generate a confidence level and an actionable recommendation 500. In this example, a device receives a signal 502 transmitted from or reflected from an object in the space 502. The signal collection engine 504 can obtain the signal 502 from one or more sources, such as the radar transmission and receiving device, the infrared receiving device, the optical receiving device, the acoustic receiving device, and/or any other receiving device. The signal 502 (such as the Doppler signature) and/or any other data collected by the image collection engine 504 can be provided as input 506 to a signal analysis engine 508. The signal analysis engine 508 can use the input 506 to identify or classify objects in the signal 502. For example, the signal analysis engine 508 can use a convolutional neural network 516 and object identification data points to identify the object within the signal 502. In one instance, the signal analysis engine 508 can analyze sound signature from the signal 502 and use the neural network 516 to intelligently identify the object based on identified patterns and/or attributes.

The neural network can be a computing system that "learns" to perform tasks by considering examples, generally without being programmed with any task-specific rules. In this instance, object recognition can be learned by analyzing object profile information that has been manually labeled and identified. Automatic labeling approaches can be used as well.

An example of a seagull profile can include data about wings, a beak, two feet, flying data at a specific altitude or specific pattern, specific sound or call data, etc. Alternatively, in another example, a drone profile can include the velocity and acceleration at which it flies, its shape, color, flying pattern, sound emitted, propeller characteristics and/or speed and so forth. To determine if an object is a Mavic drone or a seagull can require analyzing example drone profiles and seagull profiles that have been labeled as "Mavic drone" or "not a Mavic drone", "seagull" or "not a seagull" and using the results to identify Mavic drones among other object profiles, like a seagull. The neural network can do this without any prior knowledge about Mavic drones or seagulls and instead, automatically generate identifying characteristics from the learning material that they process.

In another aspect, the signal 506 that is evaluated by a signal analysis engine 508 can be a filtered signal. A Doppler signature associated with a first object that is not under study might interfere with a Doppler signature of a second object that the system is seeking to classify. By tracking the first object and classifying or identifying that object, the system can filter the first object's Doppler signature such that the second object's Doppler signature can be more cleanly evaluated to determine or classify the second object.

The signal analysis engine 508 can generate output 510, which can include an object identification, an object classification, and/or a confidence level. An actionable instruction engine 512 can receive the output 510 from the signal analysis engine 508 and use the recognized object data in the output 510 to generate an actionable instruction 514. The actionable instruction 514 can identify different commands that may be implemented in the given situation, such as to destroy the object, intimidate the object, observe the object, ignore the object, move the object, capture the object, or any other instruction. Additionally, the actionable instruction engine 512 can forward the output 510 back to the neural network 516 to update the neural network 516 and/or receive additional object identification data points to consider. As mentioned, the use of any one or a combination of radar, optical receiving device, infrared receiving device, audio receiving device or any other device, can be used when continuously receiving object data at the device.

Radar alone is able to provide useful information in relation to object identification. For example, a radar transmission can reflect off of a flying drone at a specified range and the reflected signal will produce a mini-Doppler effect that results from the drone's propellers. Because the system is sampling the received signal at a certain rate, the graphed features reflecting off of rapidly moving rotor blades can be wrapped across the screen or data record. The system receives a spreading function with certain dominant bands and each band is unique to different drones. Different drones have different blade sizes, weights, blade speed, drone speed, blade diameter, drone shape, size, profile, and so forth. The Doppler effect of the spinning blades can lead to different spreads of data sampled by a radar system at time samples say of 120 ms, for example. FIG. 5B shows what a sample Doppler signature will look like when mapped across a range 532 or distance. Typically this process is used for drones that are closer to the radar system as the further away the object is (see 536), the less signature is available to use for classification purposes. The sampled Doppler signal for a drone will show a spreading function that forms a band. The spread is obtained because the system is sampling different signals (at a sampling rate, say of 120 ms) and capturing different blade positions at each sample. The spread results because the rotors of the drone include parts that spin faster, such as the tip of the blade, and parts that do not spin at all, such as the center of the rotor. This spread function or band is unique to different drones and can be used to create the Doppler signature. These various signatures are used to train the machine learning algorithm. By classifying the signatures produced by various drones, an unidentified drone can be classified by matching the mini-Doppler signature that is produced with known drone signatures. The spread function for each drone type is used to train the machine learning model to then later identify an unknown drone as having a certain type based on the training according to the Doppler signature.

FIG. 5B illustrates various Doppler signatures for different objects. The graph 530 includes a range axis 532 and a Doppler axis 534. The challenge is how to classify objects based on Doppler signatures associated with the respective objects. Applicants identified specific radar echo features for certain drones that were returned based on drone blade movement characteristics. For example, for a drone 538, the radar echo features 540, 542, 544 can represent a moment when a blade is spinning away from the radar, and thus has a certain echo feature, whereas another portion of the echo can represent a blade spinning away from the radar. Echo feature 546 is in the + range could indicate a component of the blades that is moving towards the radar, whereas echo features 540, 542, 544 are in the "−" range, and thus can indicate movement away from the radar. The system can obtain statistical knowledge of radar target echo features for each type of drone. Target classes can be identified for various objects such as drones, vehicles, birds, and so forth. Feature 536 can represent a human which might be walking and swinging her arms back and forth which can also cause a Doppler signal with respect to that movement, but which would have a different signature relative to a drone 538.

It is noted that due to the speed of the spin of blades on a drone, the Doppler signature can indicate that the object is moving either really fast towards the radar or really fast away from the radar. The wide spread of the radar echo is because the rotors are typically moving at a speed in the range of 13000 RPM. In one aspect, the radar is measuring the speed of the blades. The system gathers data regarding the Doppler signature of drones that identifies or includes radar echo features associated with the spin of the rotors on each drone. Machine learning data can be gathered regarding the radar echo features associated with each type of known drone such that a classification can be made for a flying object using that radar signature. Any machine learning techniques can be used, such as support vector machines, a Bayesian approach, and so forth. The system in one aspect requires a radar cross-section of the object of the drone but that data can change depending on the view that the radar has of the drone and so that approach is less result reliable.

In other convolutional neural nets used for image recognition, the target data, or the true data regarding an object is typically generated by a human that would identify a house, a bird, a car, and so forth. A human would label the data to properly recognize what is being seen in the image. In the present case, a human cannot view the radar echo features and recognize which type of drone the features represent. Accordingly, the data utilized in this approach is not humanly recognizable and thus ©has to be fed into the system is for the training process.

The approach disclosed herein exploits many Doppler affects with respect to the rotor movement of a drone. The spreading function associated with various bands of radar echoes is unique to different drones, because each drone has a different blades size, weight, rotor speed, blade diameter, and blade rotational velocity. These tend to be relatively unique for each drone type, and even on a drone by drone basis. The closer the drone is to a radar in terms of range, the better the radar echo signature. As the drone moves far away, the radar echo gets smaller and more difficult to evaluate.

One comparison between a Doppler signature for a bird relative to a drone is that the bird signature will not be anything close to a drone signature because the wings flap instead of rotate and they typically moving a much lower speed. Thus, feature 536 does not show a large Doppler signature as it represents a bird. One way to classify a bird is to utilize coherent process imaging which is performed across a longer timeframe. Typically, with the drone, there is a 120 ms timespan to get the spread shown in FIG. 5B. A bird is going to take longer to obtain the radar signature and eventually the system might be feeding in multiple images over time.

With drones, in some case, the drone will transmit their own identification. The system this case can receive a drone identification, and couple that data with the radar echo, a photograph, a Doppler signature, and/or sound and determine if there is a match. The system essentially uses the various data together and can thereby identify a specific drone type or even a specific drone.

The Doppler signature is a bit like a fingerprint. The system can build a database of drone information that identifies the fingerprint for each drone type, and even each individual drone. The system can also determine if a drone is a threat by analyzing if a payload associated with a drone is a stock payload or not. The system can look at the speed of the propellers, an angle or posture of the drone, and evaluate the Doppler signature and potentially this other data that can be associated with the payload as well. For example, if a payload is heavier, the propellers may be spinning faster than normal and through the evaluation of the micro Doppler signature, inferences can be made regarding one or more of the payload weight, a shape, a configuration of the payload, and so forth.

In another aspect, the tracking feature can be utilized to filter some radar echo data from a classification evaluation. FIG. 5B illustrates this approach. Assume the system is seeking to classify object 538 and determine what the object type is, and if it's a drone, what the drone type is and even which specific drone it is. Assume the object 560 is moving towards object 538 and the tracker identifies the object at its various positions 554, 556, 558. The tracker can be a module that identifies an object, assigns a unique ID to the object, and then tracks that object as it moves through space. The tracker or a tracker module evaluates the location of the dots or images over time and uses a complicated mathematical optical technique to determine whether something is mathematically connected or correlated. When the dots are tied together, the system can track the object based in part on its unique ID and the next moment in time that object will be tied to the ID as a prediction. Thus the system will be able to tell that two things are different and have respective unique ID's. For example, item 560 can be assigned as having unique ID 0010 and item 538 with unique ID 0011. As item 560 moves, its new positions shown by 554, 556, 558 can be tracked such that when the object overlaps the wrapped signals associated with item 538, the different unique IDs can be used by the system to distinguish the signals between the two objects. The system can "kill" a signature as they go away or if they interfere with other tracks or if an image leave the field of view. The tracking module can also provide information about the speed of respective objects over time and can report graphically on an objects speed over time.

When the object arrives at position 558 in FIG. 5B, there is a possibility that its Doppler signature can be confused with the Doppler signature associated with object 538. Accordingly, as noted above, an aspect of this disclosure relates to a filtering approach, which enables the system to distinguish between the Doppler signatures of various objects, and where there is an overlap between the Doppler signatures as would occur if object 560 is in position 558, the system would filter out the Doppler signature (i.e., features 560, 548, 550, 552) when making a classification decision associated with object 538. This filtering can be based on tracking data associated with the moving object 560, identification data associate with the object 560 and an understanding of the Doppler signature of the object 560 and/or data about the object 538. Of course in other cases, object 560 might be stationary and object 538 might be the one moving such that the two objects overlap with respect to their Doppler signature. In the same scenario, if the system is seeking to classify object 538, the system can filter out the Doppler signature associated with object 560 when making the classification decision.

The system can tie together the various images and associated the unique ID with the image(s) such that the next moment in time can be tied to that object as a prediction. As multiple objects are in view, the system can differentiate between different objects with different identification numbers. A tracking module or tracking component tracks various objects, and the system can drop a respective track from analysis such that the track goes away as the object leaves the field of view or if the object is so far away that the signature becomes too small. If an initial indication of an object can be made as it begins to be tracked, that initial indication can be fed into the machine learning algorithm to enhance its ability to track the movement of the object by applying that initial indication to another snapshot of the object as it is tracked.

Figure 6:
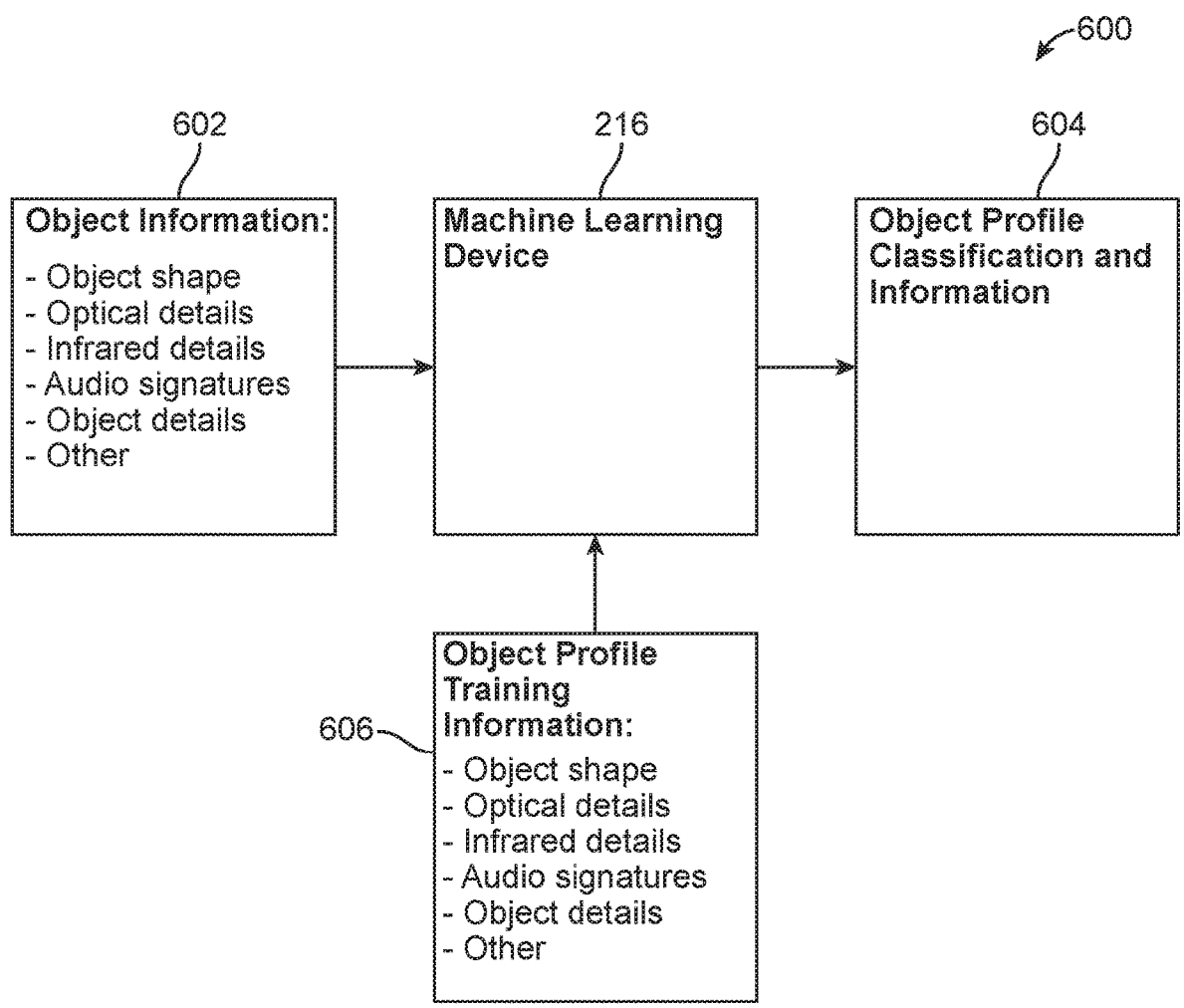
FIG. 6 illustrates an example use of machine learning using object information.

FIG. 6 shows one approach 600 to machine learning related to object information in the classification process. First, object training information 606 can include details such as an object shape, propeller speed, propeller shape, optical details, infrared details, audio signatures, radar Doppler signatures, object details, payload details, identification details, or any other information, is provided to the machine learning device 216. The machine learning device 216 is trained on this data such that it can properly classify objects when new data 602 is received. When the trained model 216 receives information 602, which can consist of one or more of an object shape, optical details, infrared details, audio signatures, object details, Doppler signature characteristics, and other information, the model 216 makes an object classification decision 604 based on its training.

In one example, object information obtained from the optical signal receiver can include, for example, data that there is a flying object that spans four feet wide and includes a payload carrying device that looks like a claw. This information is received by the machine learning device 216, which processes the input to generate an output an object profile classification and information identifying a DJI Mavic drone that is used for delivering products through the use of its payload claw system. The information profile may have included other relevant information such as the drone's top speed, level of audio or other profile characteristics. The information may also include the object's capabilities and limitations. As new drones are produced, labeling and identification data will need to be updated so as to ensure that the object profile training information is up-to-date and relevant.

Figure 7:
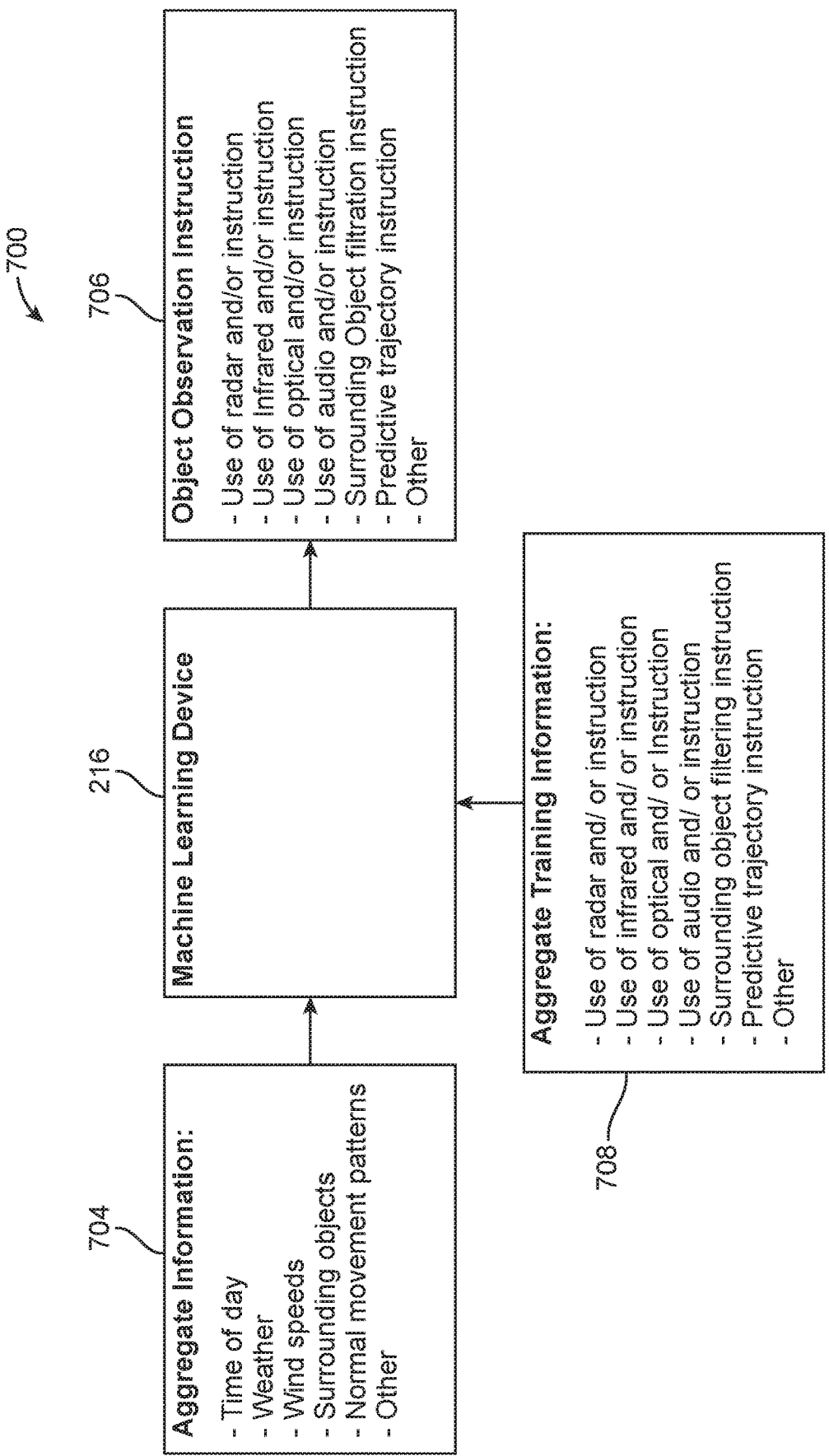
FIG. 7 illustrates an example use of machine learning using aggregate information.

FIG. 7 includes another example method 700 of how the machine learning device can be used. In one example, the machine learning device 216 receives training data including aggregate information 708, such as use of radar and/or instruction, use of infrared and/or instruction, use of optical and/or instruction, use of audio and/or instruction, surrounding object filtering instruction, predictive trajectory instruction, time of day, weather, wind speeds, surrounding objects, normal movement patterns, Doppler signatures, IR data, audio data, visual data, and so forth. The trained machine learning device 216 then receives input data 704 associated with an object and makes an object classification decision or instruction 706 associated with that object and based on the training. The object observation instruction 706 can include use of radar and/or instruction, use of infrared and/or instruction, use of optical and/or instruction, use of audio and/or instruction, surrounding object filtering instruction, predictive trajectory instruction, and other information.

When observing an object and attempting to classify or obtain an object information or an object's profile, it may be useful and more efficient to adjust the way or process of capturing the relevant information. For example, instead of the device using a radar signal, an optical signal, an infrared signal and an audio signal all at the same time, the device can find ways to speed up the signal processing by controlling what information is observed from the object by not using various signal receiving devices. Using less receiving devices would free up the processing power that would have been needed to analyze every signal and result in a timelier analysis of the object.

For example, aggregate information 704 can include that the time of day is night time and that the object is flying in close proximity and over a rural desert area that includes many hills and sand dunes and has very little noise pollution. This aggregate information 704 is used by the machine learning device 216 to determine the most efficient way to identify the object's profile and provide object observation instruction 706. The aggregate training information can be included in the machine learning 216 and may include previous scenarios that will help guide the machine learning device to make relevant considerations. In the present example, the machine learning device 216 can consider that since it is night time, it would be futile to use an optical receiving device since an optical receiving device will produce information that is subpar to information obtained by using an infrared device. Additionally, the machine learning device 216 can determine that since there is little noise pollution and that the object is within an appropriate distance rang, that a more accurate object classification can be obtained by analyzing the sound signature and that using a radar signal may complicate the analysis since the radar signal would likely bounce off of the sand dunes and corrupt the data. In this case, the machine learning device 216 could then output object observation instructions 706 to turn off the radar and the optical signal receiving devices and to turn on the audio and infrared signal receiving devices.

In another instance, the machine learning device 216 can use additional aggregate information to maintain an identity or tracking of the object because the situation in which the object is being observed changes. In one example, the view of the object becomes obstructed. In this case, object observation instructions 706 could have included using only the radar because the object had been identified and the aggregate information obtained exceeded what the machine learning device 216 deemed necessary to maintain a tracking of the object. However, in an attempt to hide from detection, the object moves behind a second object to disappear out of sight. In this instance, the machine learning data can instruct the system to use additional systems to receive different types of signals to maintain a tracking of the object as the situation requires the use of additional aggregate information. Additional aggregate information from the machine learning device 216 can include predictable flight trajectories, previous known flight trajectories, a previous flight pattern, a flight acceleration and velocity, and information regarding surrounding objects, the comparison of which will result in a quick re-identification or re-tracking as soon as the object is back within sight.

FIG. 7 has a reference to learning data and aggregate information which can also include other data as well. For example, training information 708 can include one or more of a change in the object's distance, altitude, or direction of travel, a change in the surrounding weather or audible signal, wind direction, sound information, or can include any other information that could be relevant. The training information can include one or a combination of multiple types of information and can be processed by and used to train the machine learning device 216.

Upon training, the machine learning device 216 can evaluate data such as an object distance, an object altitude, an object direction of movement, the weather around the object, the object audible signal, and other information. The machine learning device 216 can produce an object observation instruction which can include use of radar and/or instruction, use of infrared and/or instruction, use of optical and/or instruction, use of audio and/or instruction, or any other information or instruction.

Figure 8:
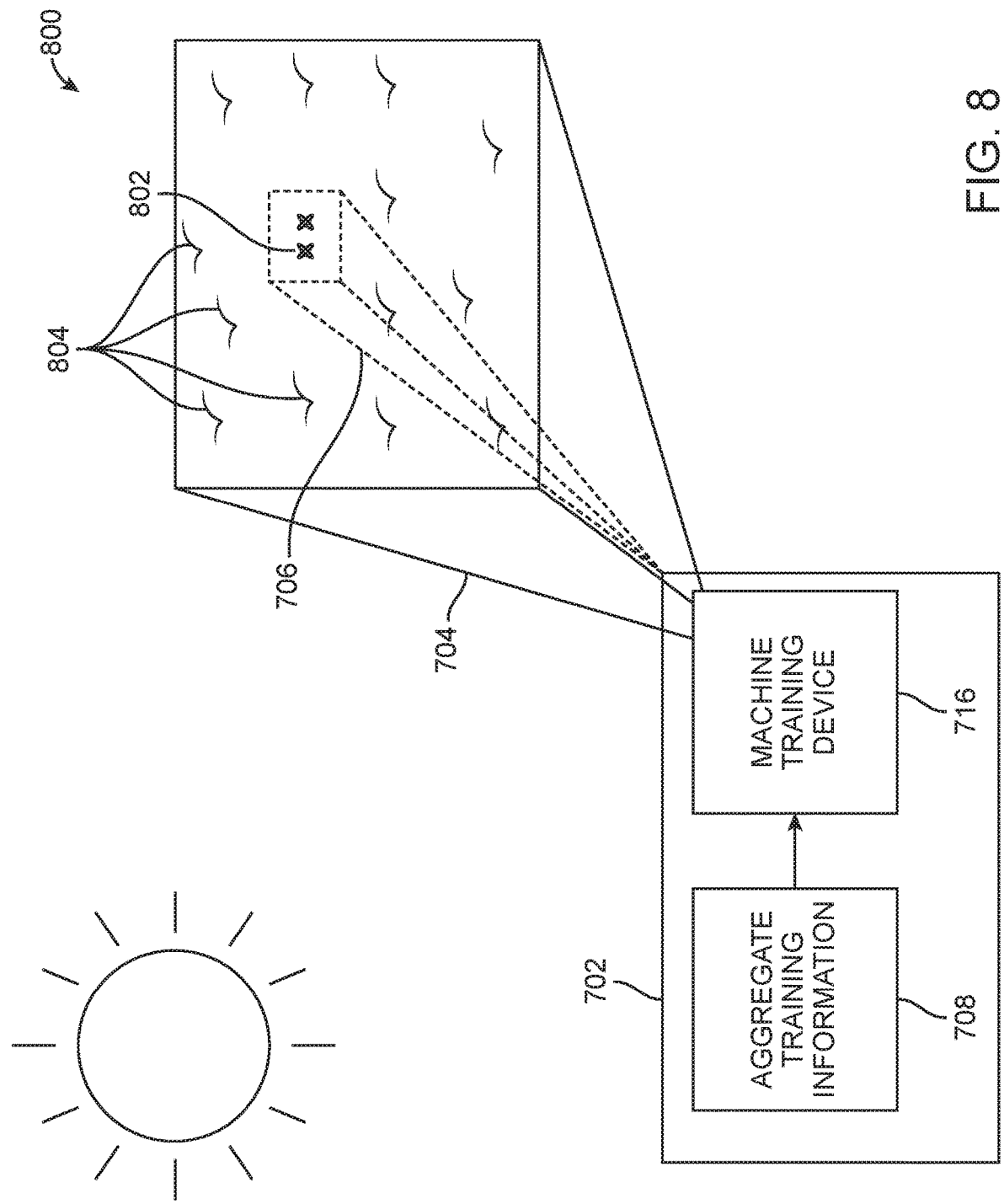
FIG. 8 illustrates an example of using machine learning to distinguish objects from birds in the air.

FIG. 8 shows a more specific method example 800, wherein a machine learning device 716 can use aggregate information 704 with aggregate training information 708 to produce a more efficient object observation instruction. In the instance of a drone 802 attempting to avoid detection by flying among a group of birds 804, using aggregate information can prove beneficial. For instance, aggregate information 704 can include details about the flying birds 804 and a flying drone 802 that is similar in size to the birds. Aggregate information 704 can be provided to the machine learning device 216 and be used to identify details of the overall movements, the flight patterns, trajectories, and so forth, of the various objects. The aggregate information 704 can be used by the device 716, which is trained on aggregate training information 708 including known bird flying patterns, behaviors, trajectories and so forth. The machine learning device 216 can generate object observation instructions which can include instructions to only observe the drone 802 and to filter out all other signals that are produced by the surrounding birds 804. The filtering can include filtering a Doppler signature of a first object when the system seeks to classify a second object and where the Doppler signatures of the objects overlap or interfere with one another.

By filtering out signals produced by the birds, the process will not waste time or energy identifying objects of non-interest and the filtering of information can lead to a faster object identification process.

Figure 9:
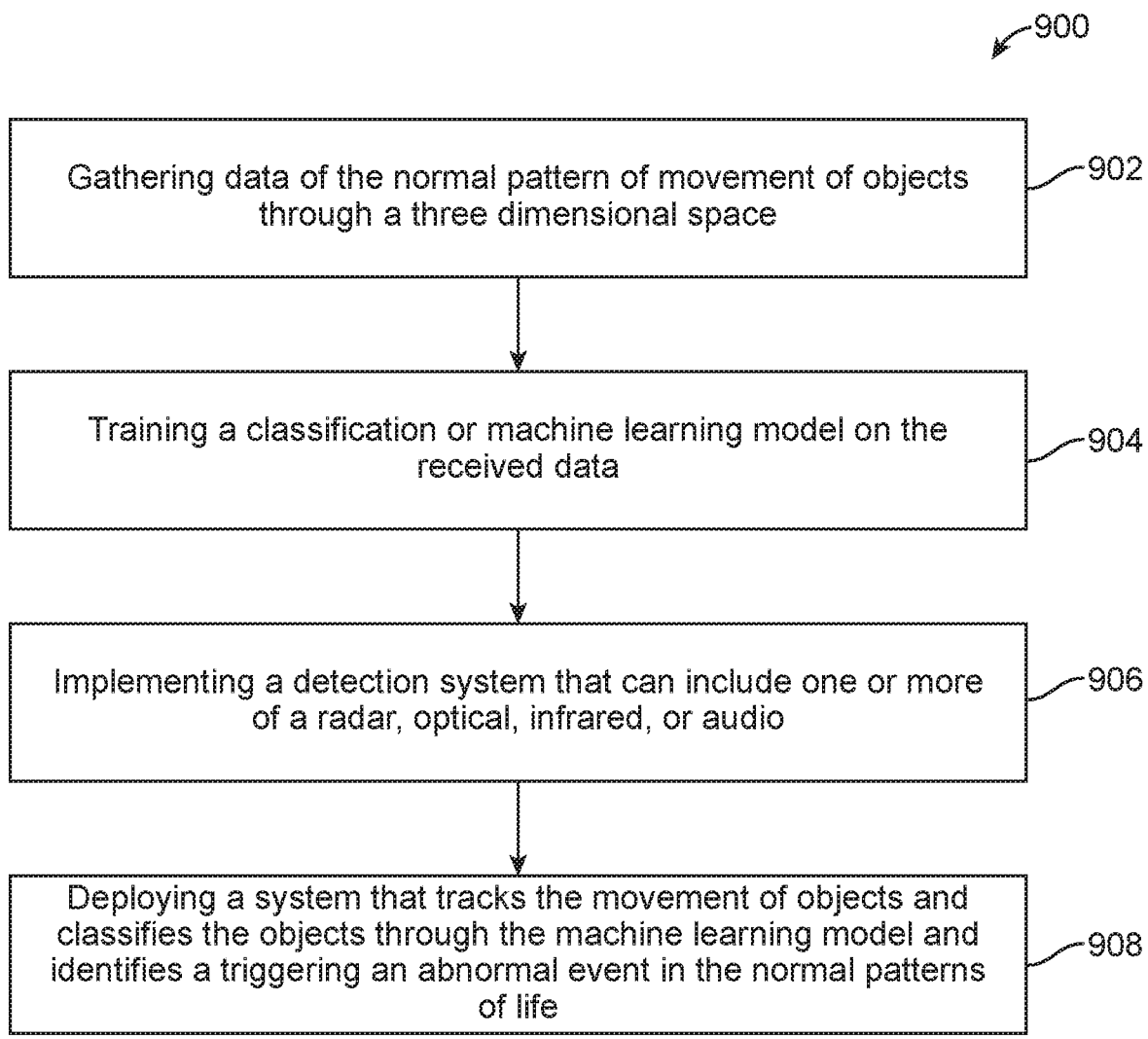
FIG. 9 illustrates an example method of classifying objects.

FIG. 9 includes an example method 900 where the device is used for gathering data of the normal pattern of movement of objects through a three dimensional space (902). The process involves training a classification or machine learning model on the received data (904), implementing a detection system that can include one or more of a radar, Doppler signatures, optical, infrared and/or audio (906) and deploying a system that tracks the movement of objects. The method includes classifying the objects through the machine learning model and identifies an abnormal event in the normal patterns of life (908). The identification of an abnormal event can trigger a notice or an action to be taken to track an individual or a vehicle or to notify authorities or take some other action.

In this example, aggregate information can be used to provide object observation instruction where the device gathers signals of normal patterns of life. Some examples can include traffic flow of people, cars, drones, and animals, weather patterns, air traffic and any other normal patterns. This information could then be input into a signal analysis engine and be used to train the machine learning models on the normal patterns of life and then to use that data to identify an object that moves contradictory to the normal pattern of life. This could be trained using neural networks and would be able to identify that the event is abnormal and result in an actionable instruction. A trigger can be sent to identify an abnormal event and to cause an instruction to be sent to a device to take an action.

In one example, the normal foot traffic and movement pattern during the lunch hour of a large city is going to show patterns that include workers flooding the sidewalks to rush out to places to eat. The normal foot traffic movements may be analyzed and used to identify objects that are not moving with or exhibiting normal movements of everyday life. The object may be walking abnormally slow, or in an unlikely manner. Perhaps the object is exhibiting loitering movements or has circled the same building five times in a row. These types of movements may be useful, especially if the abnormal movement of the object is in close proximity to a bank or the White House. Overall, the use and analysis of aggregate information such as the normal patterns of everyday life, can lead to object identification and the identification of instances that are worth noting.

Figure 10:
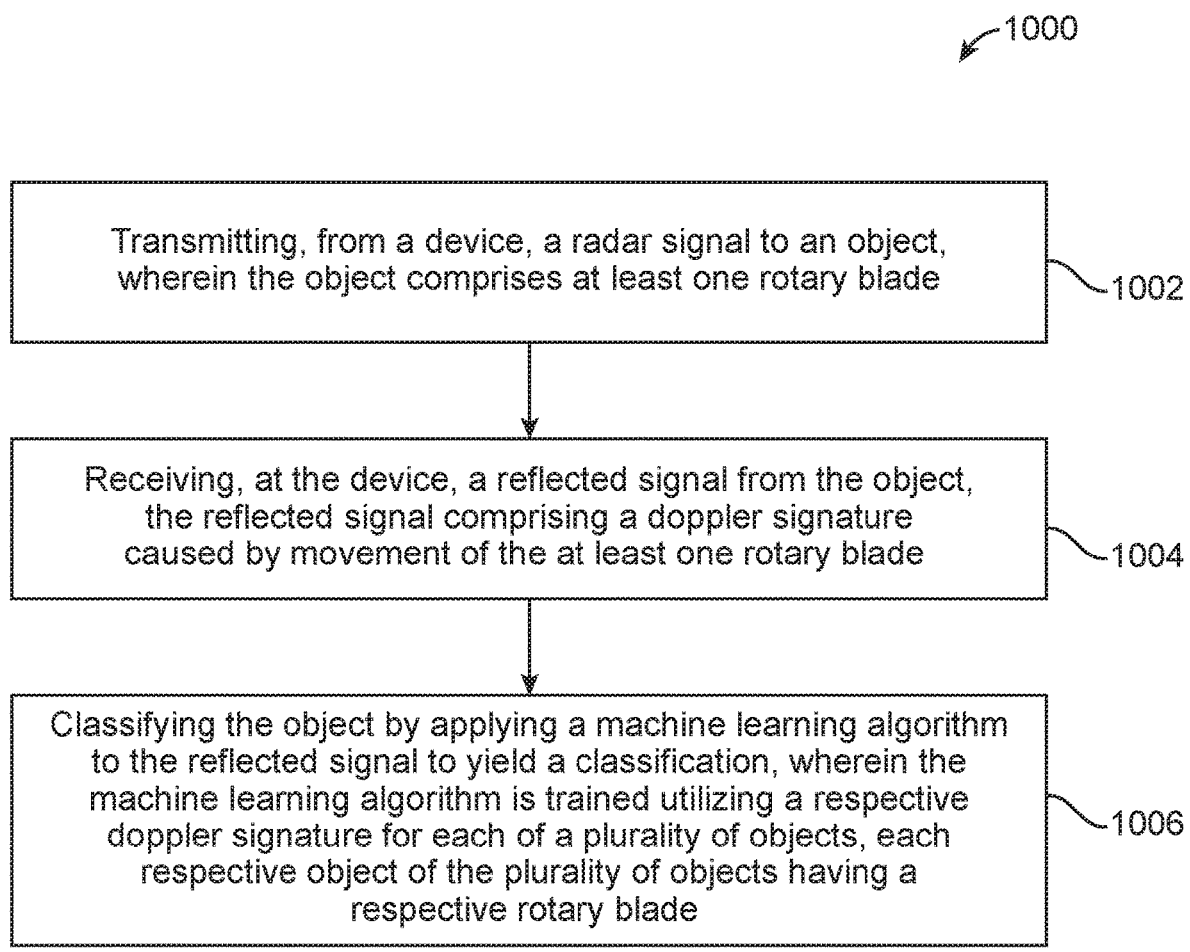
FIG. 10 illustrates an example method embodiment.

FIG. 10 illustrates another example method. A method includes transmitting, from a device, a radar signal to an object, wherein the object includes at least one rotary blade (1002), receiving, at the device, a reflected signal from the object, the reflected signal including a doppler signature caused by movement of the at least one rotary blade (1004) and classifying the object by applying a machine learning algorithm to the reflected signal to yield a classification, wherein the machine learning algorithm is trained utilizing a respective doppler signature for each of a plurality of objects, each respective object of the plurality of objects having a respective rotary blade (1006).

The method can further include receiving at the device an infrared signal associated with the object and classifying the object by applying the machine learning algorithm to the reflected radar signal and the infrared signal to yield the classification, wherein the machine learning algorithm is trained utilizing labeled infrared signals. In another aspect, the method can include receiving at the device an audio signal associated with the object and classifying the object by applying the machine learning algorithm to the reflected radar signal and the audio signal to yield the classification, wherein the machine learning algorithm is trained utilizing labeled audio signals.

In yet another aspect, the method can include receiving at the device an optical signal associated with the object and classifying the object by applying the machine learning algorithm to the reflected radar signal and the optical signal to yield the classification, wherein the machine learning algorithm is trained utilizing labeled optical signals.

Further, in another aspect, the method can include receiving at the device an audio signal associated with the object, receiving at the device an infrared signal associated with the object, receiving at the device an optical signal associated with the object and classifying the object by applying the machine learning algorithm to the reflected radar signal, the infrared signal, the audio signal and the optical signal to yield the classification, wherein the machine learning algorithm is trained utilizing labeled audio signals, labeled infrared signals and labeled optical signals.

In a further aspect, the method can include determining, by the machine learning algorithm, a moving pattern associated with the object based on one or more of the reflected radar signal, an audio signal associated with the object, an infrared signal associated with the object and an optical signal associated with the object and classifying the object by applying the machine learning algorithm to the moving pattern to yield the classification, wherein the machine learning algorithm is trained utilizing labeled moving patterns. The moving pattern can include one of patterns of flying object or patterns of movement of ground-based objects. The moving pattern can also be based at least in part on moving patterns associated with a group of objects.

In another aspect, the method can include determining, by the machine learning algorithm, a payload being carried by the object based on one or more of the reflected radar signal, an audio signal associated with the object, an infrared signal associated with the object and an optical signal associated with the object to yield a payload classification, wherein the machine learning algorithm is trained utilizing labeled payloads. In yet another aspect, the method can include transmitting an instruction, based on the classification, to an aerial vehicle scheduling and routing module and deploying, based on the classification, an aerial vehicle to engage with the object. As can be appreciated, the approach described above includes the ability to fuse together different types of signals from an object such that a machine learning algorithm can classify the object based on these different signal types.

Figure 11:
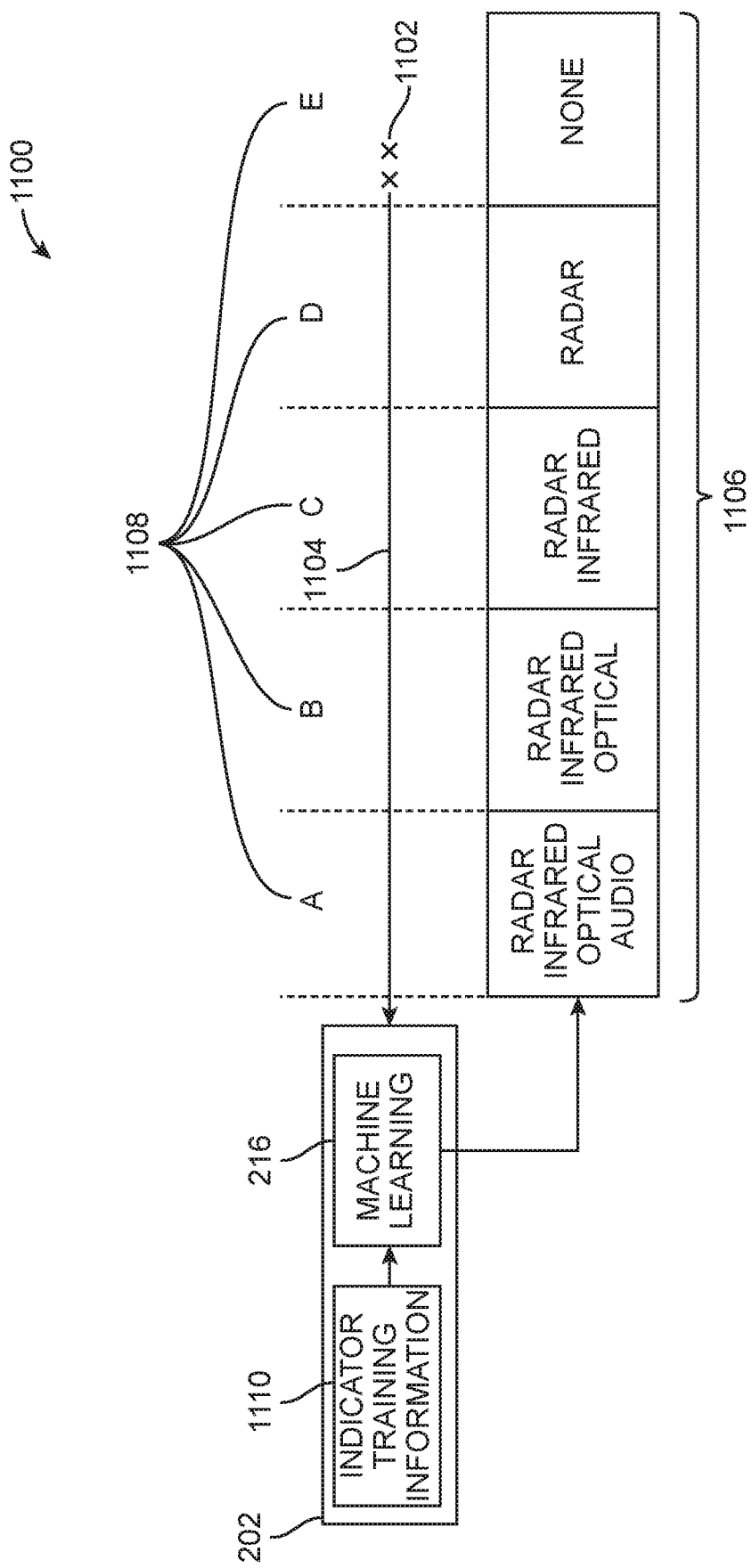
FIG. 11 illustrates an example of using different types of signals based on an object distance from a radar to object classification.

One problem with using Doppler signatures to identify an object is that it requires that the object is within a certain distance. If the drone is far away, it is possible that the radar will only be able to pick up the reflected signal from the drone and not the Doppler signature from the use of the propellers. However, the use of audio can further help in object classification. FIG. 11 illustrates 1100 the types of signals that can be used to classify an object and their relative distance from a radar system 202. An audio signal 1108(A) could be useful in object identification as almost every moving object produces sound and an analysis of that sound can lead to identification features. Just as a truck sounds different from a car, which sounds different from a motorcycle, objects in flight sound different as well. Obviously, different sound signatures exist between a helicopter and a fighter jet, but different sound signatures also exist between different drone models. Sounds can be used for objects closer to the radar system 202.

The rotors on a drone produce different sound signatures depending on whether the rotors are made from metal or plastic. Furthermore, the pitch that each drone model makes is unique and differentiable from other drone models. The identification of a drone can be determined by having the machine learning module analyze the sound that is being produced based on its training to produce a classification—which can also be based on a distance from the radar system. For example, the radar signal, which has the greatest range 1108(D), can identify a distance an object 1102 is from the radar 202. With knowledge of that distance, the system can take into account the speed of sound over ground or in the air to make adjustments on distance or classification decisions for the object.

FIG. 11 represents an example of object classification which can include a distance component 1100. An object 1102 can be a certain distance range 1108 from the device 202. A distance range can be A, B, C, D, or E, wherein A, B, C, D, and E can be any length of distance in the relative order as shown. An object distance indicator component 202 can determine within a distance range 1108 where the object 1104 is. The distance indicator 202 can include a machine learning device 216 which compares against indicator training information 1110 to produce one or more of a classification using one or more signals which can be appropriate for the respective distance the object can be from the radar system 1106. For example, the radar may indicate that the object is a distance B or a range of distances from the radar system, and an instruction can provided to the system 1106 to include an infrared signal and an optical signal to enhance the classification capability of the system 202 given the range identified. The input data can then be enhanced beyond radar to add other signal types to improve the classification analysis based on different types of data and based on a distance from the radar system.

In one example, if the object lies at a distance of C, the object observation instruction 1106 can include the use of radar and an infrared signal receiver. This could be determined by the machine learning device 216 because the machine has learned that when an object lies within the distance C, it is best to use radar and infrared signals to analyze the object. Alternatively, if the object 1102 is within the object distance range D, than the object observation instruction can include only using radar. This could be learned by the machined learning device 216 because at a distance of D, the best way to observe the object is through the use of radar and that the distance is too far for audio to be effective. In this example, a change in the object's distance indicates the potential use of a different type of signal receiving device as determined by the machine learning device 216.

Figure 12:
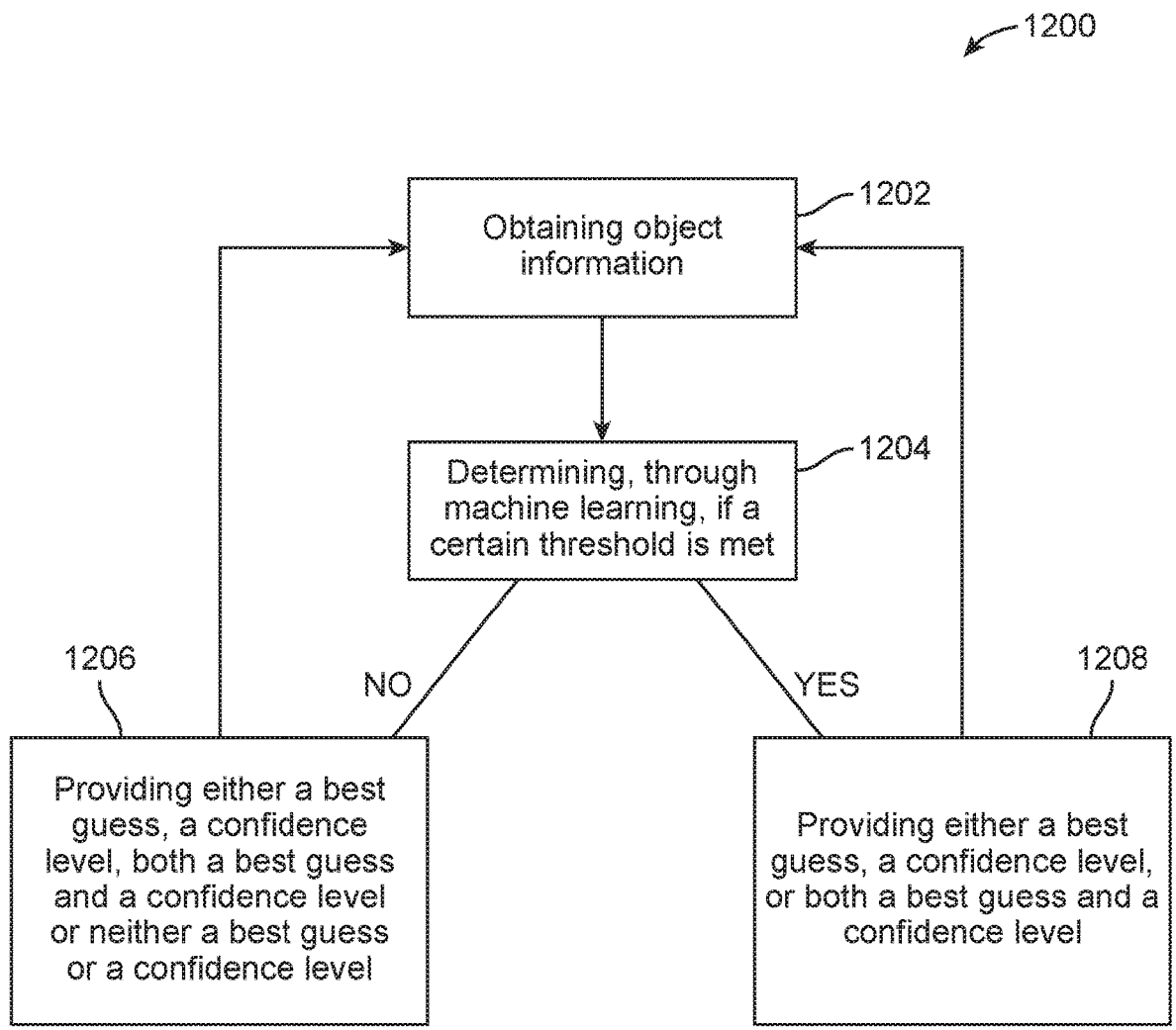
FIG. 12 illustrates an example flow of confidence level decision making.

FIG. 12 includes another method example 1200 that can include a progressive approach to determine whether a threshold confidence level is met before providing a classification. The method example 1200 includes obtaining object information (1202), determining, through machine learning, if a certain threshold is met (1204) and if it is, providing either a best guess, a confidence level, or both a best guess and a confidence level (1208) and then continue obtaining object information (1202). If the threshold is not met, the method includes providing either a best guess, a confidence level, both a best guess and a confidence level or neither a best guess or a confidence level (1206) and then continue obtaining object information (1202).

One example scenario that highlights this method in combination with multiple alternative methods discussed herein can start with an object that is 4 kilometers away from the device. The information that is obtained from an object that is 4 km away will use machine learning to determine how accurate and reliable the object information is. At 4 km away, range capabilities may limit the types of signals that can be received. For example, the use of radar only may yield a determination or classification having a margin of error that is not acceptable. At 4 kilometers away the radar reading may be able to provide a best guess, with a 25% confidence level, that the object is a drone. At this distance and with a 25% confidence level, the machine learning device 216 may determine that the threshold is not met and that it should continue obtaining object information.

As the drone approaches, additional and updated information is obtained from different types of signals such as optical or infrared signals to increase the quality of the object classification. If, for example, the object is detected at night, the machine learning device may instruct the use of the infrared receiving device. The system may also shine a light on the object when it is in range to get an optical read on the object to enhance the probability of a good classification. If the object is detected during the day, the machine learning device or the system can request that the optical receiving device be used. In another instance, if the drone is flying through the clouds, the audio receiving device can be instructed to record audio data. Any other signal receiving device can be instructed to receive signals as it is deemed necessary by the machine learning device. Part of the machine learning can be to learn through training which signal receiving device or combination of devices will yield the timeliest and accurate object classification. Another device can also make this determination besides the machine learning device.

In the continued example, suppose that using an optical receiving device results in a different type of signal being analyzed for object classification and the new analysis increases the reliability to an 80% confidence level that the object is a drone in general and, with the new and combined information, may have a 20% confidence level that the drone is a specific type of drone, such as a Mavic. The object will continue to be monitored and object information will continue to be obtained and evaluated by the machine learning device. As the object continues to approach, the machine learning device can instruct the use of another signal receiving device, such as a microphone, to receive an audio signal which can be analyzed to produce more accurate results that still meet the threshold, but increase the confidence level to be 99.9% that the object is a drone, an 80% confidence level it is a Mavic. The system can additionally conclude that there is a 40% chance that the drone is carrying a payload. The device will continue obtaining object information and as more and more information is received from all or a fusion of the receiving signal devices. The resulting information can confirm with a certain confidence that the object is a Mavic drone, and that it is carrying a payload, and that it has a 80% confidence level that it is an Amazon product deliverable. At that point, the object may have reached an acceptable identification threshold for all three classifications as determined by the machine learning device, and may then provide instruction on how to act or may determine that no instructions are needed.

In the continued example, relevant instructions can be to continue to monitor and identify the object until the object has a 95% confidence level that the object is a Mavic drone that is carrying a non-hostile product as a payload. However, in an alternative example, if the same object were identified with a 99.9% confidence level that it is a hostile drone carrying an explosive device, the instructions from the machine learning device can include deploying another drone or a swarm of drones to intercept and destroy the incoming hostile drone. Alternatively, if the object were identified to be a bird, the instructions from the machine learning device can be to ignore the bird. In another example, perhaps the object identified is a drone without an explosive device, but it is flying over restricted air space. In this instance, the instruction determined from the machine learning device may be to deploy a drone or team of drones to monitor and intimidate the unwanted drone until it leaves the restricted airspace. Lastly, the instructions from a machine learning device may be any other set of instruction not previously listed.

Figure 13:
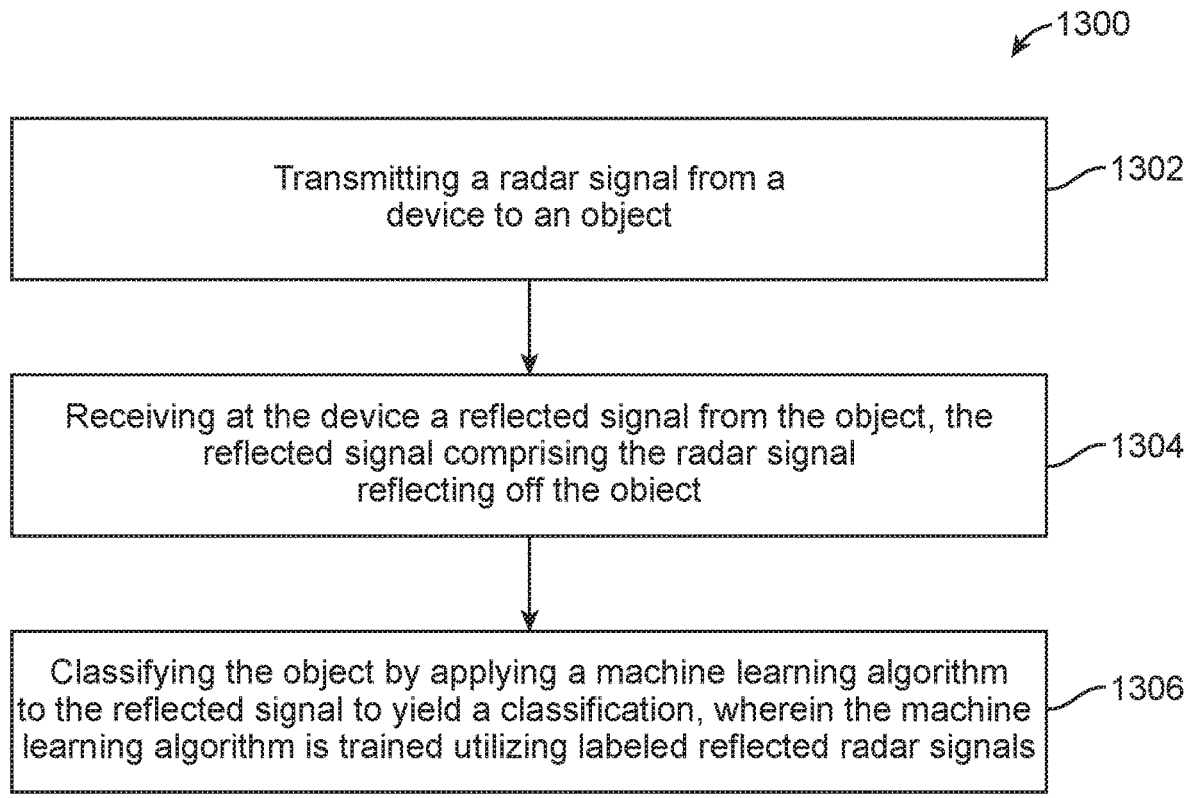
FIG. 13 illustrates an example method embodiment.

A summary of the overall method described herein is included in FIG. 13. First, the method includes transmitting a radar signal from a device to object information (1302). Next, the method involves receiving at the device a reflected signal from the object, the reflected signal from the object (1304), which can include a Doppler signature. Finally, the method results in classifying the object by applying a machine learning algorithm to the reflected signal to yield a classification, wherein the machine learning algorithm is trained utilizing labeled reflected radar signals (1306). The machine learning algorithm will be trained on known drone and/or other object Doppler signatures.

Some drones may transmit their own identification signal, like a AIS signal transmitted by boats. The system could receive that signal and incorporate it into their machine learning analysis to confirm a classification decision or not.

Various modifications and changes may be made to the principles described herein without following the examples and applications illustrated and described herein, and without departing from the spirit and scope of the disclosure. Claim language reciting "at least one of" a set indicates that one member of the set or multiple members of the set satisfy the claim.

In one aspect, the approach disclosed herein can involve "supervised" learning. There is another class of learning referred to as "Unsupervised", wherein the algorithm will, itself, choose what to learn from, thereby making the machine smarter each flight. An unsupervised learning approach is another aspect of this disclosure. After an amount of "supervised" training, wherein a flying device, upon finding a previously unknown drone, can automatically learn its relevant signature, and add it to the list of known signatures on the fly. This unsupervised learning approach enables drones to become smarter and smarter with time.

In addition to unsupervised learning for drone classification or signature data, there is also the concept of "unsupervised" learning of flight patterns. In one example, a drone is trained using supervised training on flight patterns of various objects. Again, upon finding an unknown object with an unknown flight pattern, the drone can automatically learn the flight patterns of that new object. In this case, predictions can cause the drone to head off the object, instead of following it to capture it. The predictions used can be generated by unsupervised learning and/or a combination of supervised learning and unsupervised learning.

In some embodiments, the computer-readable storage devices, mediums, and or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. Any token or structure/function disclosed herein can apply to a tokenized asset offering or a security token offering.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features of configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other in any combination.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

The invention claimed is:

1. A method comprising:
transmitting, from a device, a radar signal to a flying object, wherein the flying object comprises at least one rotary blade which enables the flying object to fly;
receiving, at the device, a reflected signal from the flying object, the reflected signal comprising a doppler signature caused by rotating movement of the at least one rotary blade; and
classifying the flying object by applying a machine learning algorithm to the reflected signal to yield a classification, wherein the machine learning algorithm is trained utilizing a respective doppler signature based on a respective rotating movement for each respective at least one rotary blade for each of a plurality of flying objects, wherein the respective rotating movement includes a first part in which the respective at least one rotary blade is moving towards the device and a second part in which the respective at least one rotary blade is moving away from the device.

2. The method of claim 1, wherein the radar signal comprises frequencies between 30 MHz and 300 GHz.

3. The method of claim 1, further comprising:
receiving at the device an infrared signal associated with the flying object; and
classifying the flying object by applying the machine learning algorithm to the reflected signal and the infrared signal to yield the classification, wherein the machine learning algorithm is trained utilizing labeled infrared signals.

4. The method of claim 1, further comprising:
receiving at the device an audio signal associated with the flying object; and
classifying the flying object by applying the machine learning algorithm to the reflected signal and the audio signal to yield the classification, wherein the machine learning algorithm is trained utilizing labeled audio signals.

5. The method of claim 1, further comprising:
receiving at the device an optical signal associated with the flying object; and
classifying the flying object by applying the machine learning algorithm to the reflected signal and the optical signal to yield the classification, wherein the machine learning algorithm is trained utilizing labeled optical signals.

6. The method of claim 1, further comprising:
receiving at the device an audio signal associated with the flying object;
receiving at the device an infrared signal associated with the flying object;
receiving at the device an optical signal associated with the flying object; and
classifying the flying object by applying the machine learning algorithm to the reflected signal, the infrared signal, the audio signal and the optical signal to yield the classification, wherein the machine learning algorithm is trained utilizing labeled audio signals, labeled infrared signals labeled optical signals.

7. The method of claim 1, further comprising:
determining, by the machine learning algorithm, a moving pattern associated with the flying object based on one or more of the reflected signal, an audio signal associated with the flying object, an infrared signal associated with the flying object and an optical signal associated with the flying object; and
classifying the flying object by applying the machine learning algorithm to the moving pattern to yield the classification, wherein the machine learning algorithm is trained utilizing labeled moving patterns.

8. The method of claim 7, wherein the moving pattern comprises one of patterns of flying objects or patterns of movement of ground-based objects.

9. The method of claim 7, wherein the moving pattern is based at least in part on moving patterns associated with a group of flying objects.

10. The method of claim 1, further comprising:
determining, by the machine learning algorithm, a payload being carried by the flying object based on one or more of the reflected signal, an audio signal associated with the flying object, an infrared signal associated with the flying object and an optical signal associated with the flying object to yield a payload classification, wherein the machine learning algorithm is trained utilizing labeled payloads.

11. The method of claim 1, further comprising:
transmitting an instruction, based on the classification, to an aerial vehicle scheduling and routing module.

12. The method of claim 1, further comprising:
deploying, based on the classification, an aerial vehicle to engage with the flying object.

13. A system comprising:
a processor; and
a computer-readable storage medium having instructions stored which, when executed by the processor, cause the processor to perform operations comprising:
transmitting a radar signal from a device to a flying object;
receiving at the device a reflected signal from the flying object, the reflected signal comprising a Doppler signature associated with a rotary movement of at least one rotary blade on the flying object, wherein the rotary movement comprises a first part in which the at least one rotary blade is moving towards the system and a second part in which the at least one rotary blade is moving away from the system; and
classifying the flying object by applying a machine learning algorithm to the reflected signal to yield a classification, wherein the machine learning algorithm is trained utilizing labeled reflected radar signals.

14. The system of claim 13, wherein the computer-readable storage medium stores additional instructions which, when executed by the processor, cause the processor to perform operations further comprising:
receiving at the device an infrared signal associated with the flying object; and
classifying the flying object by applying the machine learning algorithm to the reflected signal and the infrared signal to yield the classification, wherein the machine learning algorithm is trained utilizing labeled infrared signals.

15. The system of claim 13, wherein the computer-readable storage medium stores additional instructions which, when executed by the processor, cause the processor to perform operations further comprising:
receiving at the device an audio signal associated with the flying object; and
classifying the flying object by applying the machine learning algorithm to the reflected signal and the audio signal to yield the classification, wherein the machine learning algorithm is trained utilizing labeled audio signals.

16. The system of claim 13, wherein the computer-readable storage medium stores additional instructions which, when executed by the processor, cause the processor to perform operations further comprising:
receiving at the device an optical signal associated with the flying object; and
classifying the flying object by applying the machine learning algorithm to the reflected signal and the optical signal to yield the classification, wherein the machine learning algorithm is trained utilizing labeled optical signals.

17. The system of claim 13, wherein the computer-readable storage medium stores additional instructions which, when executed by the processor, cause the processor to perform operations further comprising:
receiving at the device an audio signal associated with the flying object;
receiving at the device an infrared signal associated with the flying object;
receiving at the device an optical signal associated with the flying object; and
classifying the flying object by applying the machine learning algorithm to the reflected signal, the audio signal, the infrared signal and the optical signal to yield the classification, wherein the machine learning algorithm is trained utilizing labeled radar signals, labeled audio signals, labeled infrared signals and labeled optical signals.

18. The system of claim 13, wherein the computer-readable storage medium stores additional instructions which, when executed by the processor, cause the processor to perform operations further comprising:
determining, by the machine learning algorithm, a moving pattern associated with the flying object based on one or more of the reflected signal associated with the flying object, an audio signal associated with the flying object, an infrared signal associated with the flying object and an optical signal associated with the flying object; and
classifying the flying object by applying the machine learning algorithm to the moving pattern to yield the classification, wherein the machine learning algorithm is trained utilizing labeled moving patterns.

19. A system comprising:
a radar component that transmits a radar signal and receives a reflected radar signal from a flying object, the reflected radar signal comprising a Doppler signature of the flying object, wherein the Doppler signature of the flying object is based on a first part in which a rotary blade of the flying object is moving towards the system and a second part in which the rotary blade is moving away from the system;
an infrared receiving component that receives an emitted infrared signal from the flying object;
a microphone that receives an audible signal generated by the flying object;
a camera that receives an optical signal associated with the flying object; and
a machine learning module that receives signals comprising the reflected radar signal, the emitted infrared signal, the audible signal, and the optical signal, and utilizes the signals to yield a classification of the flying object.

* * * * *